United States Patent
Nojima

(10) Patent No.: US 7,634,186 B2
(45) Date of Patent: Dec. 15, 2009

(54) IMAGING APPARATUS, IMAGE STORAGE APPARATUS, IMAGING METHOD, STORAGE METHOD, RECORDING MEDIUM RECORDING IMAGING PROGRAM, AND RECORDING MEDIUM RECORDING STORAGE PROGRAM

(75) Inventor: Osamu Nojima, Hachioji (JP)

(73) Assignee: Casio Computer Co., Ltd., Tokyo (JP)

( * ) Notice: Subject to any disclaimer, the term of this patent is extended or adjusted under 35 U.S.C. 154(b) by 394 days.

(21) Appl. No.: 11/345,944

(22) Filed: Feb. 2, 2006

(65) Prior Publication Data
US 2006/0171697 A1 Aug. 3, 2006

(30) Foreign Application Priority Data
Feb. 3, 2005 (JP) ............................ 2005-027883

(51) Int. Cl.
*G03B 13/00* (2006.01)
(52) U.S. Cl. ...................................... 396/103
(58) Field of Classification Search ............. 396/103
See application file for complete search history.

(56) References Cited
U.S. PATENT DOCUMENTS

| | | | |
|---|---|---|---|
| 4,231,647 A | 11/1980 | Kitai et al. | |
| 4,541,702 A | 9/1985 | Momose et al. | |
| 2001/0010556 A1 | 8/2001 | Sugimoto et al. | |
| 2003/0128281 A1* | 7/2003 | Nihei et al. | 348/222.1 |
| 2005/0041136 A1* | 2/2005 | Miyata et al. | 348/345 |
| 2005/0088538 A1* | 4/2005 | Nozaki et al. | 348/229.1 |
| 2005/0104992 A1* | 5/2005 | Aoyama et al. | 348/345 |
| 2005/0264678 A1* | 12/2005 | Butterworth | 348/345 |

FOREIGN PATENT DOCUMENTS
JP   11-177873 A   7/1999

* cited by examiner

Primary Examiner—Christopher E Mahoney
Assistant Examiner—Fang-Chi Chang
(74) Attorney, Agent, or Firm—Frishauf, Holtz, Goodman & Chick, P.C.

(57) ABSTRACT

A still image focused on a desired subject is captured and stored in a more reliable manner without particularly increasing in size and complicating an apparatus and circuits. There are provided a photographing system including a lens optical system which has an autofocus function and captures a subject image, a motor and a CCD, a key input section including a shutter key to instruct photography, and a control unit which causes the photographing system to sequentially capture a still image by actuating the autofocus function and a still image with a fixed focus allowing a fixed depth of field to be obtained, in accordance with the operation of the shutter key.

1 Claim, 14 Drawing Sheets

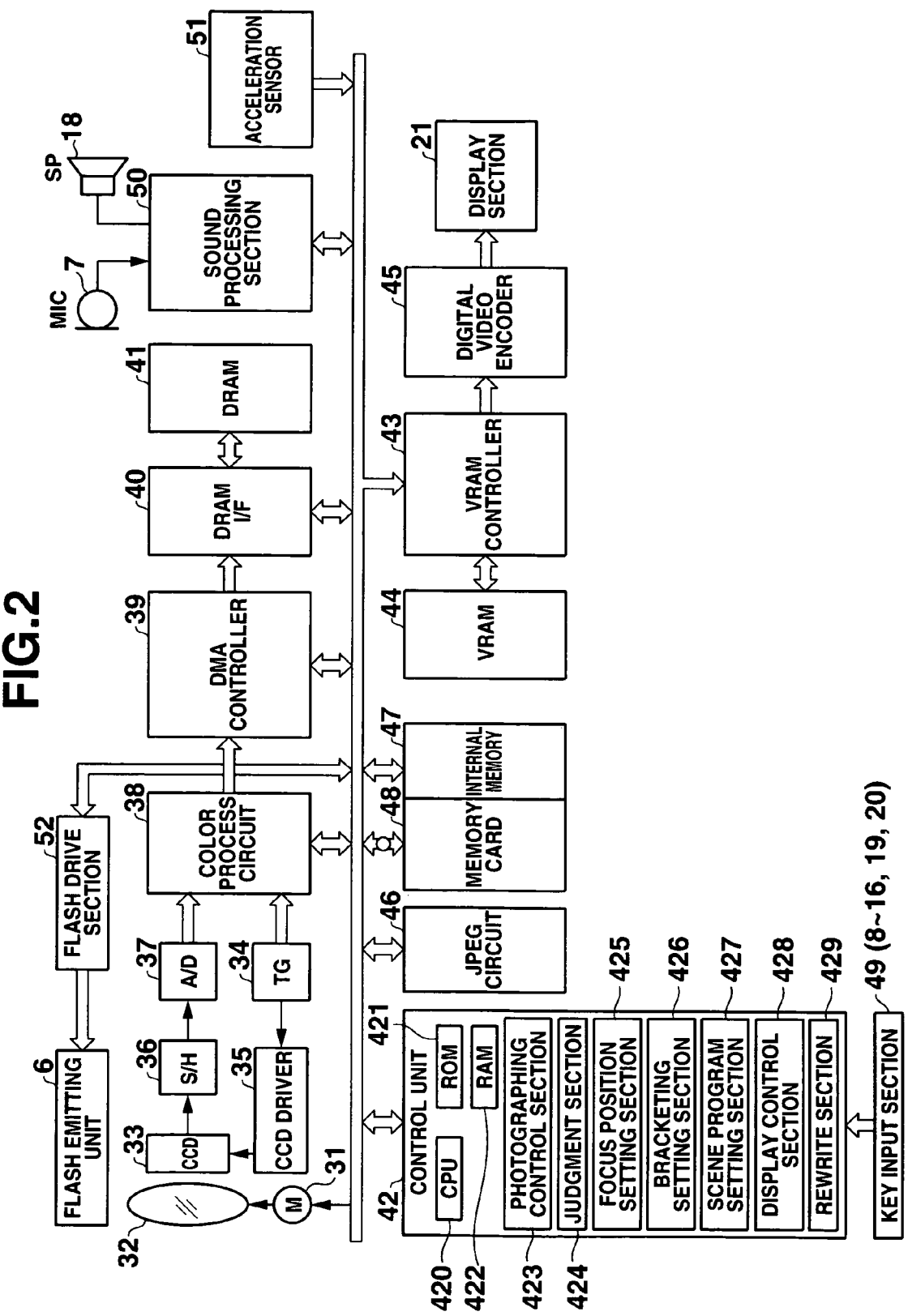

IMAGING APPARATUS, IMAGE STORAGE APPARATUS, IMAGING METHOD, STORAGE METHOD, RECORDING MEDIUM RECORDING IMAGING PROGRAM, AND RECORDING MEDIUM RECORDING STORAGE PROGRAM

CROSS-REFERENCE TO RELATED APPLICATIONS

This application is based upon and claims the benefit of priority from prior Japanese Patent Application No. 2005-027883, filed Feb. 3, 2005, the entire contents of which are incorporated herein by reference.

BACKGROUND OF THE INVENTION

1. Field of the Invention

The present invention relates to an imaging apparatus particularly suitable for, for example, a digital still camera having an autofocus function, an image storage apparatus, an imaging method, a storage method, a recording medium recording an imaging program, and a recording medium recording a storage program.

2. Description of the Related Art

Heretofore, a technique has been devised wherein, in order to capture images focused on a subject desired by a photographer even when the distance from the subject rapidly changes or there are many different objects around the subject, a plurality of images of different focal distances is captured in one imaging operation (e.g., Patent document 1).

[Patent Document 1] Jpn. Pat. Appln. KOKAI Publication No. 11-177873

However, in the technique of the above-mentioned patent document, a high-speed variable-focus lens capable of instantaneously changing a focal distance and a drive circuit thereof are provided in order to sequentially capture a plurality of images of focal distances other than the focal distance originally regarded as proper, thus resulting in a complicated and expensive configuration of the apparatus and requiring a memory with higher capacity to store a plurality of images obtained by photographing.

In other words, the technique of the above-mentioned patent document takes a blunderbuss approach, which results in much load on the apparatus and is therefore not suitable for small and light digital cameras of a type that places great importance on, for example, compactness and battery life.

BRIEF SUMMARY OF THE INVENTION

One of preferred aspects of this invention is an imaging apparatus comprising: a photographing unit which has an autofocus function and captures a subject image; an instruction unit which instructs to perform photography by the photographing unit; and a photographing control unit which causes the photographing unit to capture a still image by actuating the autofocus function and a still image by moving a lens to a predesignated position where a fixed depth of field can be obtained, in accordance with the instruction from the instruction unit.

Furthermore, one of the preferred aspects of this invention is an imaging apparatus comprising: a photographing unit which has an autofocus function and captures a subject image; an instruction unit which instructs to perform photography by the photographing unit; a scene program setting section in which a plurality of conditions for the photography by the photographing unit has been preprogrammed/preset; a scene selection unit which selects one of the plurality of photographing conditions set in the scene program setting section; and a photographing control unit which, in accordance with the instruction from the instruction unit, causes the photographing unit to capture a still image based on the program/setting of the photographing condition selected in the scene selection unit, and to capture a still image by moving a lens to a predesignated position where a fixed depth of field can be obtained when the selected photographing condition is a predetermined condition.

Furthermore, one of the preferred aspects of this invention is an image storage apparatus comprising: a storage unit which differentiates sequentially captured still images including a still image obtained by autofocus photography and a still image obtained in photography performed by moving a lens to a predesignated position where a fixed depth of field can be obtained and which assigns an order of priority to the still images before storing them in relation to each other; a selection unit which selects one from a plurality of sets of still images stored in the storage unit in relation to each other; a display control section which causes a still image with a higher order of priority selected by the selection unit to be displayed among the still images stored in relation to each other; a replacement instruction section which instructs to replace the still image displayed by the display control section; and a rewrite section which rewrites an order of priority of the still images stored in the storage unit in accordance with the instruction of the replacement instruction section.

Furthermore, one of the preferred aspects of this invention is a imaging method for an imaging apparatus comprising a photographing unit which has an autofocus function and captures a subject image, and the method comprises: an instruction step of instructing to perform photography by the photographing unit; and a photographing control step of causing the photographing unit to capture a still image by actuating the autofocus function and a still image by moving a lens to a predesignated position where a fixed depth of field can be obtained, in accordance with the instruction in the instruction step.

Furthermore, one of the preferred aspects of this invention is a imaging method for an imaging apparatus comprising a photographing unit which has an autofocus function and captures a subject image, and the method comprises: an instruction step of instructing to perform photography by the photographing unit; a scene program setting step in which a plurality of conditions for the photography by the photographing unit has been preprogrammed/preset; a scene selection step of selecting one of the plurality of photographing conditions set in the scene program setting step; a photographing control step of causing the photographing unit to capture a still image based on the program/setting of the photographing condition selected in the scene selection step and to capture a still image by moving a lens to a predesignated position where a fixed depth of field can be obtained when the selected photographing condition is a predetermined condition accordance with the instruction in the instruction step.

Furthermore, one of the preferred aspects of this invention is a storage method for an image storage apparatus comprising a storage unit which stores still images, and the method comprises: a storage control step of differentiating sequentially captured still images including a still image obtained by autofocus photography and a still image obtained in photography performed by moving a lens to a predesignated position where a fixed depth of field can be obtained, and assigning an order of priority to the still images before storing them in the storage unit in relation to each other; a selection step of selecting one from a plurality of sets of still images stored in the storage unit in relation to each other; a display control step of displaying a still image with a higher order of priority selected in the selection step among the still images stored in relation to each other; a replacement instruction step of instructing to replace the still image displayed in the display control step; and a rewrite step of rewriting the order of priority of the still images stored in the storage unit in accordance with the instruction in the replacement instruction step.

Furthermore, one of the preferred aspects of this invention is a recording medium recording an imaging program executed by a computer built into an imaging apparatus comprising a photographing unit which has an autofocus function and captures a subject image, and the computer executes: an instruction step of instructing to perform photography by the photographing unit; and a photographing control step of causing the photographing unit to capture a still image by actuating the autofocus function and a still image by moving a lens to a predesignated position where a fixed depth of field can be obtained, in accordance with the instruction in the instruction step.

Furthermore, one of the preferred aspects of this invention is a recording medium recording an imaging program executed by a computer built into an imaging apparatus comprising a photographing unit which has an autofocus function and captures a subject image, and the computer executes: an instruction step of instructing to perform photography by the photographing unit; a scene program setting step in which a plurality of conditions for the photography by the photographing unit has been preprogrammed/preset; a scene selection step of selecting one of the plurality of photographing conditions set in the scene program setting step; a photographing control step of, in accordance with the instruction in the instruction step, causing the photographing unit to capture a still image based on the program/setting of the photographing condition selected in the scene selection step, and to capture a still image by moving a lens to a predesignated position where a fixed depth of field can be obtained when the selected photographing condition is a predetermined condition.

Furthermore, one of the preferred aspects of this invention is a recording medium recording a storage program executed by a computer built into an image storage apparatus comprising a storage unit which stores still images, and the computer executes: a storage control step of differentiating sequentially captured still images including a still image obtained by autofocus photography and a still image obtained in photography performed by moving a lens to a predesignated position where a fixed depth of field can be obtained, and assigning an order of priority to the still images before storing them in the storage unit in relation to each other; a selection step of selecting one from a plurality of sets of still images stored in the storage unit in relation to each other; a display control step of displaying a still image with a higher order of priority selected in the selection step among the still images stored in relation to each other; a replacement instruction step of instructing to replace the still image displayed in the display control step; and a rewrite step of rewriting the order of priority of the still images stored in the storage unit in accordance with the instruction in the replacement instruction step.

BRIEF DESCRIPTION OF THE SEVERAL VIEWS OF THE DRAWING

FIG. 2 is a block diagram showing a functional configuration of an electronic circuit according to the first embodiment;

DETAILED DESCRIPTION OF THE INVENTION

First Embodiment

A first embodiment in which the present invention is applied to a digital camera will hereinafter be described in reference to the drawings.

Figure 1A:
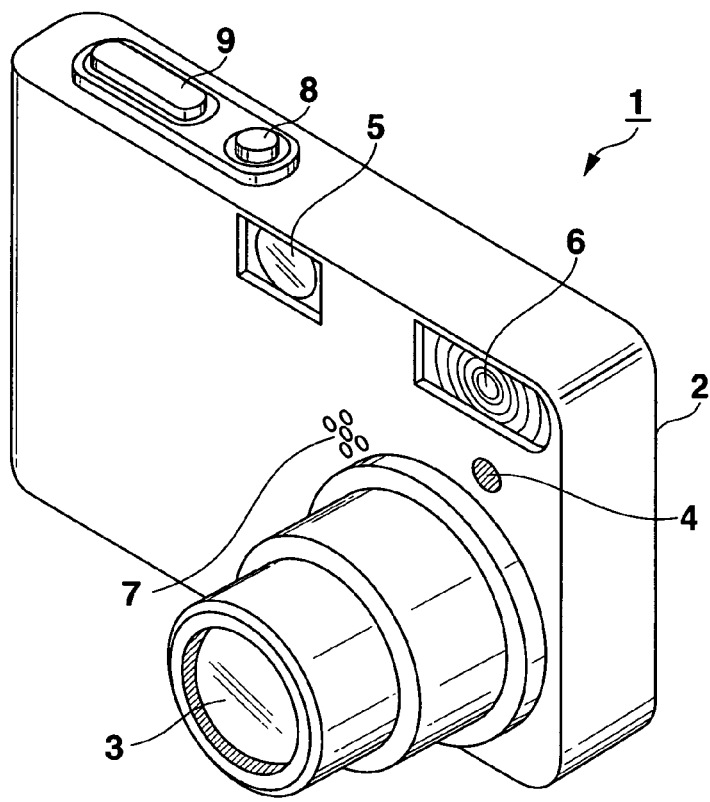
FIG. 1A and FIG. 1B are perspective views showing an external configuration of a digital camera according to a first embodiment of the present invention.
Figure 1B:
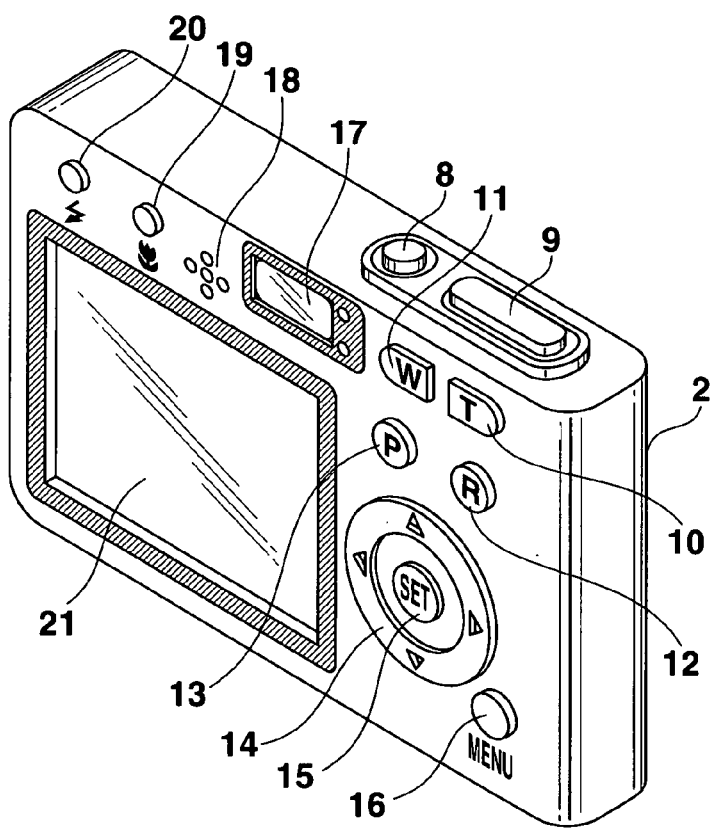

FIG. 1A and FIG. 1B show an external configuration of the digital camera, and FIG. 1A is a perspective view mainly showing a foreside thereof, while FIG. 1B is a perspective view mainly showing a rear side thereof.

In a digital camera 1, there are arranged, on a front surface of a substantially rectangular thin-plate-shaped body 2, a photographing lens 3, a self-timer lamp 4, an optical finder window 5, a flash light emitting unit 6 (auxiliary illumination unit) and a microphone 7. There are arranged, on a right edge side of an upper surface (for a user), a power supply key 8 and a shutter key 9 (an instruction unit, a detection unit).

The photographing lens 3 has a lens configuration having a variable focus function which is a zoom function ranging from a wide-angle area to a telescopic area, and an autofocus (AF) function.

The power supply key 8 is a key operated every time a power supply is turned on/off, and the shutter key 9 instructs to perform photography in a photographing mode.

Furthermore, on a rear surface of the digital camera 1, there are arranged a tele(T)-key 10, a wide (W)-key 11, a photographing (R) mode key 12, a reproduction (P) mode key 13, a ring key 14, a set key 15, a menu key 16, an optical finder 17, a speaker section 18, a macro key 19, a flash key 20 and a display section 21.

The tele-key 10 and the wide-key 11 are operated to vary a focal distance of the photographing lens 3 to a wide-angle side or a telescopic side.

The photographing mode key 12 is operated in a state where the power supply is turned off to automatically turn on the power supply, thereby shifting to a photographing mode to capture a still image. On the other hand, the photographing mode key 12 is repeatedly operated in a state where the power supply is turned on to circularly select and set a state of capturing still images, a state of capturing moving images or a state of recording sound.

The reproduction mode key 13 is operated in the state where the power supply is turned off to automatically turn on the power supply, thereby shifting to a reproduction mode.

The ring key 14 integrally forms vertical and horizontal item selection keys, and an item selected at the moment is set by the set key 15 located in the center of the ring key 14.

The menu key 16 is operated to select various menu items and the like.

The macro key 19 is operated to switch between ordinary photography and macro photography in the photographing mode of the still image.

The flash key 20 is operated to switch the light emission mode of the flash light emitting unit 6.

The display section 21 comprises a color liquid crystal panel with a backlight, and it performs monitor display of through images as an optical finder in the photographing mode, while reproducing/displaying a selected image or the like in a reproduction mode.

It is to be noted that although not shown in the drawings, there are provided, on a bottom surface of the digital camera 1, a memory card slot for insertion/removal of a memory card used as a recording medium, a serial interface connector such as a universal serial bus (USB) connector for connection to an external personal computer or the like.

Next, a configuration of an electronic circuit of the digital camera 1 will be described with FIG. 2.

In a monitoring state in the photographing mode, a motor (M) 31 is driven to properly move the position of some lenses, more specifically, a zoom lens and a focus lens, in a lens optical system 32 constituting the photographing lens 3. A CCD 33 which is a solid-state image sensing device is disposed at a image focus location in the rear of a photographing optical axis of the lens optical system 32 via an unshown mechanical shutter. The motor (M) 31, the lens optical system 32 and the CCD 33 correspond to a photographing unit.

The CCD 33 is driven for scanning by a timing generator (TG) 34 and a CCD driver 35, and outputs a photoelectric conversion output corresponding to a formed optical image for one screen at each regular period.

This photoelectric conversion output is properly subjected to a gain adjustment for each primary color component of RGB in a state of an analog-value signal, and then sampled and held by a sample and hold (S/H) circuit 36.

The photoelectric conversion output is then converted into digital data in an Analog to Digital (A/D) converter 37, and subjected to color processing including image interpolation processing and γ correction processing in a color process circuit 38.

Thus, a luminance signal Y and color-difference signals Cb, Cr in digital values are generated, and they are output to a direct memory access (DMA) controller 39.

The DMA controller 39 temporarily writes the luminance signal Y and the color-difference signals Cb, Cr output by the color process circuit 38 into a buffer in the DMA controller 39 by use of a composite synchronous signal, a memory write enable signal and a clock signal also coming from the color process circuit 38, and performs a DMA transfer to a DRAM 41 which is used as a buffer memory via a DRAM interface (I/F) 40.

A control unit 42 comprises a CPU 420, a ROM 421 fixedly storing an operation program used for photography by auto-focus and fixed focus described later, a RAM 422 used as a work memory, a photographing control section 423 which controls photography, a judgment section 424 which judges a state in which an in-focus position is difficult to obtain, a focus position setting 425 section which arbitrarily fixes and sets the in-focus position, a bracketing setting section 426 which variably sets predetermined photographing conditions in stages, a scene program setting section 427 into which a plurality of photographing conditions has been preprogrammed, a display control section 428 which controls image display, and a rewrite section 429 which rewrites an order of priority of still images. The control unit 42 controls/operates the entire digital camera 1. After finishing the DMA transfer of the luminance and color-difference signals to the DRAM 41, the control unit 42 reads the luminance and color-difference signals from the DRAM 41 via the DRAM interface 40, and writes them into a VRAM 44 via a VRAM controller 43.

A digital video encoder 45 regularly reads the luminance and color-difference signals from the VRAM 44 via the VRAM controller 43, and generates a video signal on the basis of these data and thus outputs it to the display section 21.

The display section 21 functions as a monitor display section (electronic view finder) in the image photographing mode as described above, and performs display based on the video signal from the digital video encoder 45 to display in real time an image based on image information imported from the digital video encoder 45 at the moment.

Thus, a trigger signal is generated if the shutter key 9 is operated with such timing that a still image is desired to be captured while the image at the moment which is a so-called through image is being displayed as a monitor image on the display section 21 in real time.

In accordance with the trigger signal, the control unit 42 cancels the DMA transfer to the DRAM 41 of the luminance and color-difference signals for one screen imported from the CCD 33 at the moment. The control unit 42 again drives the unshown mechanical shutter and the CCD 33 at a shutter speed corresponding to a proper exposure condition to obtain activation and color-difference signals for one screen, and transfers then to the DRAM 41. The control unit 42 then stops this path, and shifts to a state of storage/save.

In this state of storage/save, the control unit 42 reads the luminance and color-difference signals for one frame written in the DRAM 41 via the DRAM interface 40 in a unit called a basic block of vertical 8 pixels×horizontal 8 pixels for each of the components of Y, Cb and Cr, and writes them into a Joint Photograph coding Experts Group (JPEG) circuit 46. In this JPEG circuit 46, data compression is carried out by processing such as adaptive discrete cosine transform (ADCT) and Huffman coding which is an entropy coding method.

Furthermore, obtained code data is read from the JPEG circuit 46 as a data file for one image, and written into an internal memory 47 (storage unit) which is a storage medium of the digital camera 1 or into a memory card 48 (storage unit) detachably attached to the digital camera 1.

Then, the control unit 42 again actuates the path from the CCD 33 to the DRAM 41 along with completion of compression processing of the luminance and color-difference signals for one frame or completion of writing of totally compressed data into the internal memory 47 or the memory card 48.

Here, out of the internal memory 47 and the memory card 48, the memory card 48 is given priority to write and read various kinds of data including data on the still images. That is, data is written into/read from the internal memory 47 in a state where the memory card 48 is removed and not present, whereas data is written into/read from the memory card 48 in a state where the memory card 48 is attached.

Moreover, to the control unit 42, there are connected a key input section 49, a sound processing section 50, an acceleration sensor 51 (hand movement detection section) and a flash drive section 52.

The key input section 49 (a photography specifying section, a scene selection section, a selection section, a replacement instruction section) comprises the power supply key 8, the shutter key 9, the tele-key 10, the wide-key 11, the photographing mode key 12, the reproduction mode key 13, the ring key 14, the set key 15, the menu key 16, the macro key 19 and the flash key 20. Signals associated with the operation of these keys are directly delivered to the control unit 42.

The sound processing section 50 comprises a sound source circuit such as a PCM sound source. During sound recording, the sound processing section 50 digitizes a sound signal input from the microphone section (MIC) 7, and performs data compression in accordance with a predetermined data file format such as an MPEG-1 audio layer 3 (MP3) standard to create a sound data file, and thus sends it to the internal memory 47 or the memory card 48. On the other hand, during sound reproduction, the sound processing section 50 decompresses the sound data file sent from the internal memory 47 or the memory card 48 and converts it into an analog form, and drives the speaker section (SP) 18 provided on the rear side of the digital camera 1 to output sound loud.

The acceleration sensor 51 detects a movement acceleration in a direction along a plane parallel with an imaging surface of the CCD 33, and digitizes its detection output and sends it to the control unit 42.

The flash drive section 52 charges a high-capacity condenser for an unshown flash when capturing a still image, and then drives the flash light emitting unit 6 for flashing under the control of the control unit 42.

Thus, when it is selected to capture moving images instead of the still image, a series of operations is sequentially executed at a proper frame rate, for example, 30 [frames/second] at the start, wherein the above-mentioned still image data is obtained and compressed in the JPEG circuit 46 at the first operation of the shutter key 9, and then stored in the internal memory 47 or the memory card 48. At the point where the shutter key 9 is operated second time or where a predetermined time limit, for example, 30 seconds have passed, the series of still image data files is collectively reset as data files (AVI files) of motion JPEG.

Furthermore, during the reproduction mode, the control unit 42 selectively reads the image data stored in the internal memory 47 or the memory card 48. The JPEG circuit 46 decompresses the compressed image data in a procedure totally reverse to that in compressing the data in the photographing mode. After the decompressed image data is retained in the DRAM 41 via the DRAM interface 40, contents retained in the DRAM 41 are stored in the VRAM controller 43 via the DRAM interface 40, and the image data is regularly read from the VRAM 44 to generate a video signal, which is reproduced/output on the display section 21.

When the selected image data is a moving image instead of a still image, individual still image data constituting a selected moving image file is reproduced sequentially in time.

At the point where the reproduction of the final still image data is terminated, reproduction/display is performed only using the still image data located at the head until a next reproduction instruction is issued.

Now, an operation in this embodiment will be described.

It is to be noted that in this digital camera 1, the shutter key 9 has a two-stage operation stroke as in other typical cameras, and a photographing operation is executed on the basis of an operation logic as follows: at a first step, autofocus (AF) processing and automatic exposure (AE) processing are performed in a state generally called half press where the shutter key is pressed down to about half of a full stroke, and individual values in the processing are locked; and at a second step, actual photography is executed with the above AF value and AE value in an operation with a full stroke generally called full press.

Furthermore, photography with a fixed focus (the lens is moved to a predesignated position) described later (referred to as "PF photography" in the drawing) means photography performed by so-called "stop-down" wherein a focus lens is moved to a predetermined position and an aperture (F) value and a shutter speed are read and set on the basis of a lookup table fixedly prestored in the ROM within the control unit 42 in accordance with the focal distance position of the zoom lens selected at the moment, an ISO film speed set at the moment and an AE value (light amount), thereby performing photography by obtaining a state called pan focus (PF) where a depth of field practically covering the whole distance is obtained, or by obtaining a fixed great depth of field close to the above-mentioned depth of field.

Figure 3:
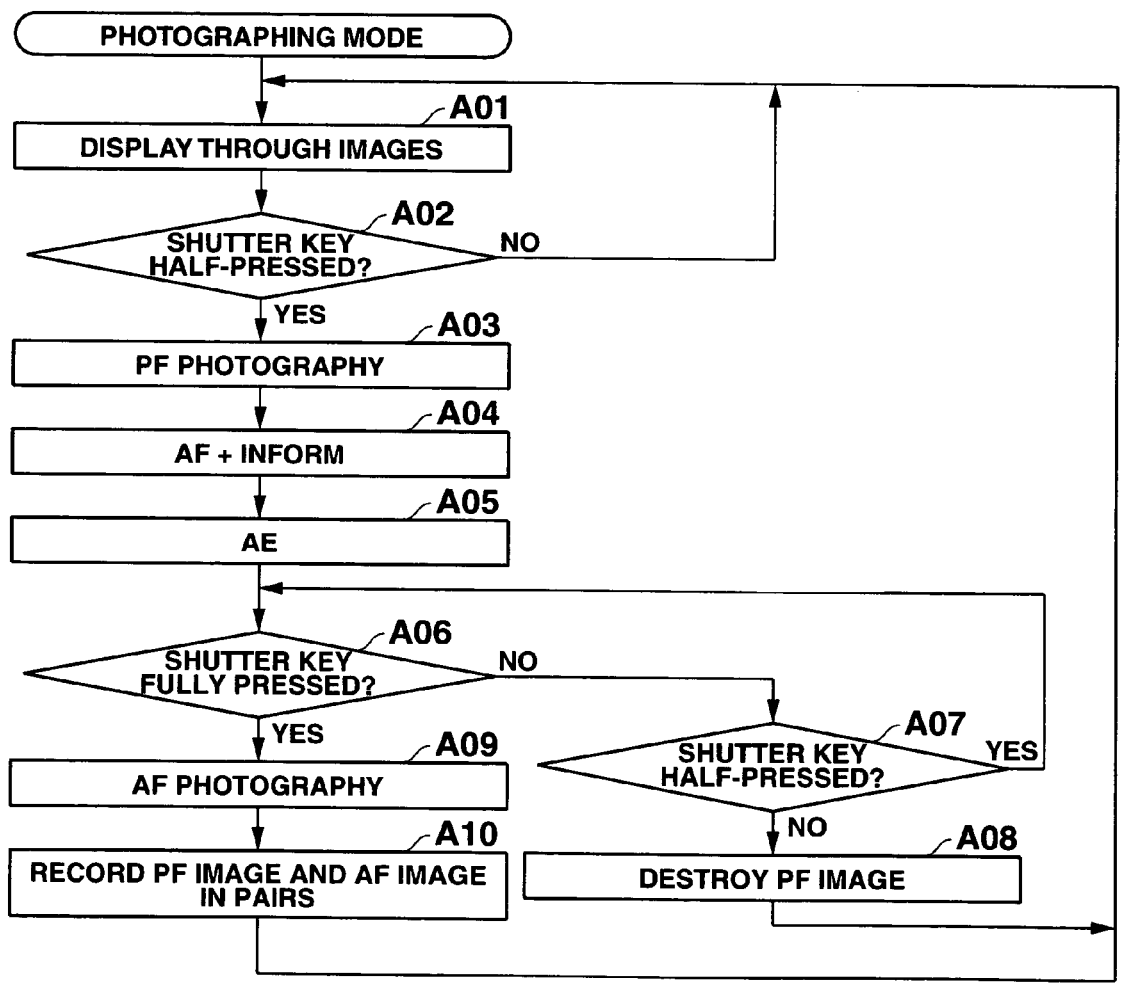
FIG. 3 is a flowchart showing processing contents in a photographing mode according to the first embodiment.

FIG. 3 shows contents of processing performed when a still image is captured in the photographing mode. Initially, simple AF processing and AE processing are executed within a predetermined frame rate at the moment, for example, 30 [frames/second], and the CCD 33 is sequentially driven at a high shutter speed considering the frame rate, thereby maintaining a through image display state in which contents imaged by the CCD 33 are displayed on the display section 21 (step A01), and also judging whether or not the shutter key 9 of the key input section 49 has been half-pressed (step A02). Such processing is repeatedly performed to wait for the shutter key 9 to be in a half-pressed state.

Thus, if the shutter key 9 is half-pressed, this is judged in step A02. The focus lens of the lens optical system 32 is moved in accordance with the focal distance and the AE value corresponding to the position of the zoom lens of the lens optical system 32 at the moment, so that photography is performed with a fixed focus allowing a fixed great depth of field to be obtained, and an obtained image is retained in the DRAM 41 (step A03).

In conjunction with this, the value of a distance to a subject is accurately measured, and the focal distance value is locked. On the other hand, a electronic sound such as beeping is output loud by the speaker section 18 to inform a user that the still image has been captured with the fixed focus (step A04).

Next, a proper exposure value is obtained from a state in which the autofocus position is locked. After setting an aperture value and a shutter speed from the exposure value and locking them (step A05), it is repeatedly judged whether or not the shutter key 9 has been further fully pressed (step A06) and whether or not it is still half-pressed (step A07), thus waiting for the shutter key 9 to be fully pressed while the AF and AE states are locked or waiting for the half-pressed state to be cancelled.

Here, when the half-pressed state of the shutter key 9 is cancelled, this is judged in step A07, concluding that the actual photography has not been reached. Data on the still image retained in the DRAM 41 at the moment and obtained by the photography based on the fixed focus in step A03 is deleted for nullification (step A08), and a return is made again to the processing in step A01.

Furthermore, if the shutter key 9 is fully pressed from the state in which the AF value and AE value are locked, this is judged in step A06, and a still image is captured while the photographing conditions in accordance with the autofocus function is being locked, thereby obtaining image data (step A09).

Subsequently, both data on the still image obtained with the autofocus and data on the still image obtained by the fixed focus in step A03 are compressed and converted into files in the JPEG circuit 46, and stored/saved on the internal memory 47 or the memory card 48 (step A10). A series of processes regarding the photography thus terminates, and a return is made to the processing in step A01 to again prepare for next photography.

In this case, for data files to be recorded on the internal memory 47 or the memory card 48, a file name such as "200309080001a.jpg" is set and stored for the data file of the still image captured with the autofocus, while a file name such as "200309080001b.jpg" is set and stored for the data file of the still image captured by the fixed focus. These two data files can thus be recognized as a pair and differentiated.

In the above-mentioned file names, "200309080001" indicates that the photography was performed on "2003 (year)09 (month)08(day)" "0001(first)". Photographing condition data additionally set in the file include not only typical information such as photographing date and time, the ISO film speed, an image size, a shutter speed, an aperture (F) value and a while balance, but also identification information indicating whether the photography was conducted by the actuation of the autofocus function or by the fixed focus.

Therefore, it is possible not only to identify, owing to the file names of the stored data files, that the two still images are paired and were sequentially captured but also to know from the photographing condition data whether the photography was conducted by the actuation of the autofocus function or by the fixed focus.

Figure 4A:
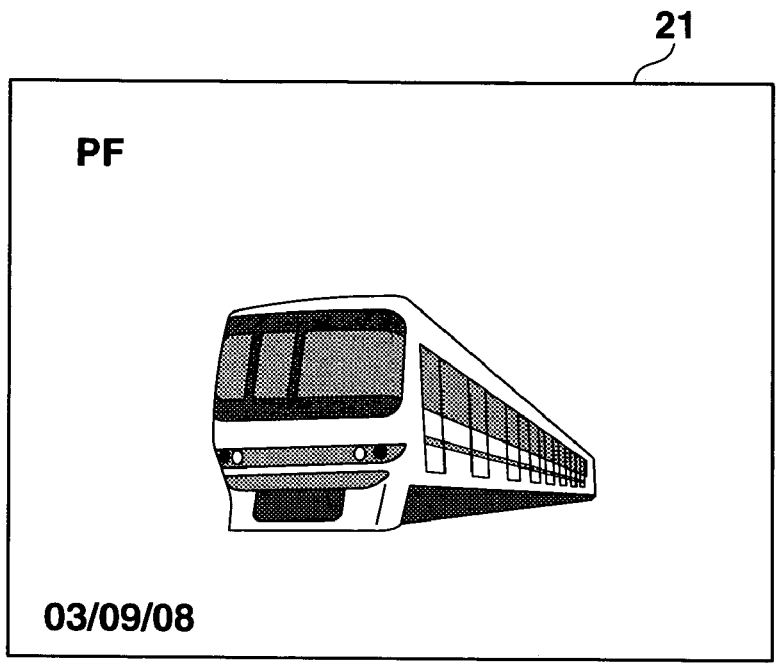
FIG. 4A and FIG. 4B are diagrams illustrating two photographing results according to the first embodiment: a photographic image by a fixed focus and a photographic image by autofocus.

FIG. 4A illustrates a state where the still image captured with the fixed focus is read and displayed on the display section 21 in the reproduction mode, wherein characters "PF" indicating that the photography was conducted by the fixed focus are displayed, for example, at an upper left end in a screen on the basis of the photographing condition data.

Figure 4B:
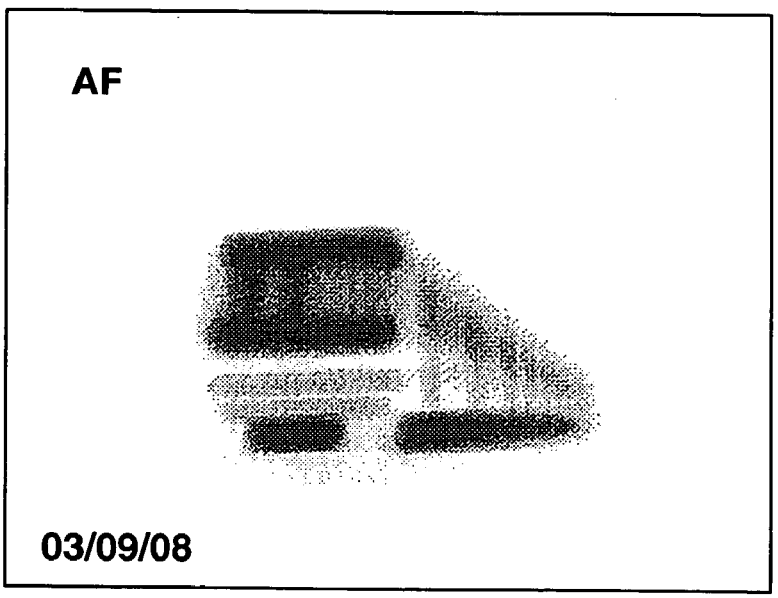

On the other hand, FIG. 4B illustrates a state where the still image captured by the actuation of the autofocus function and stored to be paired with the still image shown in FIG. 4A is read and displayed on the display section 21, wherein characters "AF" indicating that the photography was conducted by the actuation of the autofocus function are displayed, for example, at the upper left end in the screen on the basis of the photographing condition data.

Thus, as understood referring to FIG. 4A and FIG. 4B, even when the still image captured by the actuation of the autofocus function is out of focus or blurred due to a factor such as the hand movement, it is highly likely that the still image captured with the fixed focus immediately before the autofocus photography is sufficiently vivid. This makes it possible to capture and store a still image focused on the desired subject with a high probability without particularly increasing in size and complicating the apparatus and circuits.

In addition, the still image based on the fixed focus is generally captured in the so-called half-press operation of the shutter key 9 to lock the autofocus (AF) or automatic exposure (AE) in many cameras, and the still image based on the autofocus is captured in the subsequent full-press operation, thereby allowing the user to obtain the still image based on the fixed focus without feeling discomfort.

Furthermore, when the actual photography by the autofocus function has not been reached, the data on the image based on the fixed focus captured earlier is destroyed, and it is therefore ensured that the unnecessary waste of limited storage capacity in the internal memory 47 or the memory card 48 can be avoided.

It is to be noted that the half-press operation of the shutter key 9 causes the photography based on the fixed focus allowing a fixed great depth of field to be obtained, but the photography based on the fixed focus may be performed after AF photography in step A09.

Second Embodiment

A second embodiment in which the present invention is applied to a digital camera will hereinafter be described in reference to the drawings.

It is to be noted that an external configuration of the digital camera is basically similar to that in FIG. 1A and FIG. 1B and a functional configuration of an electronic circuit is basically similar to that in FIG. 2, so that the same numerals are used for the same parts and those parts are not shown and described.

Furthermore, a lens optical system 32 constituting a photographing lens 3 is adapted to an autofocus function in a contrast method, so that a position where a contrast value is the highest is judged by a control unit 42 from a change in contrast of an image formed in a CCD 33 by movement of a focus lens.

Now, an operation in this embodiment will be described.

It is to be noted that in a digital camera 1, a shutter key 9 has a two-stage operation stroke as in other typical cameras, and a photographing operation is executed on the basis of an operation logic as follows: at a first step, autofocus (AF) processing and automatic exposure (AE) processing are performed in a state generally called half press where the shutter key is pressed down to about half of a full stroke, and individual values in the processing are locked; and at a second step, actual photography is executed with the above AF value and AE value in an operation with a full stroke generally called full press.

Furthermore, photography with a fixed focus described later (referred to as "PF photography" in the drawing) means photography performed by so-called "stop-down" wherein the focus lens is moved to a predetermined position and an aperture (F) value and a shutter speed are read and set on the basis of a lookup table fixedly prestored in a ROM within a control unit 42 in accordance with the focal distance position of the zoom lens selected at the moment, an ISO film speed set at the moment and an AE value (light amount), thereby performing photography by obtaining a state called pan focus (PF) where a depth of field practically covering the whole distance is obtained, or by obtaining a fixed great depth of field close to the above-mentioned depth of field.

Figure 5:
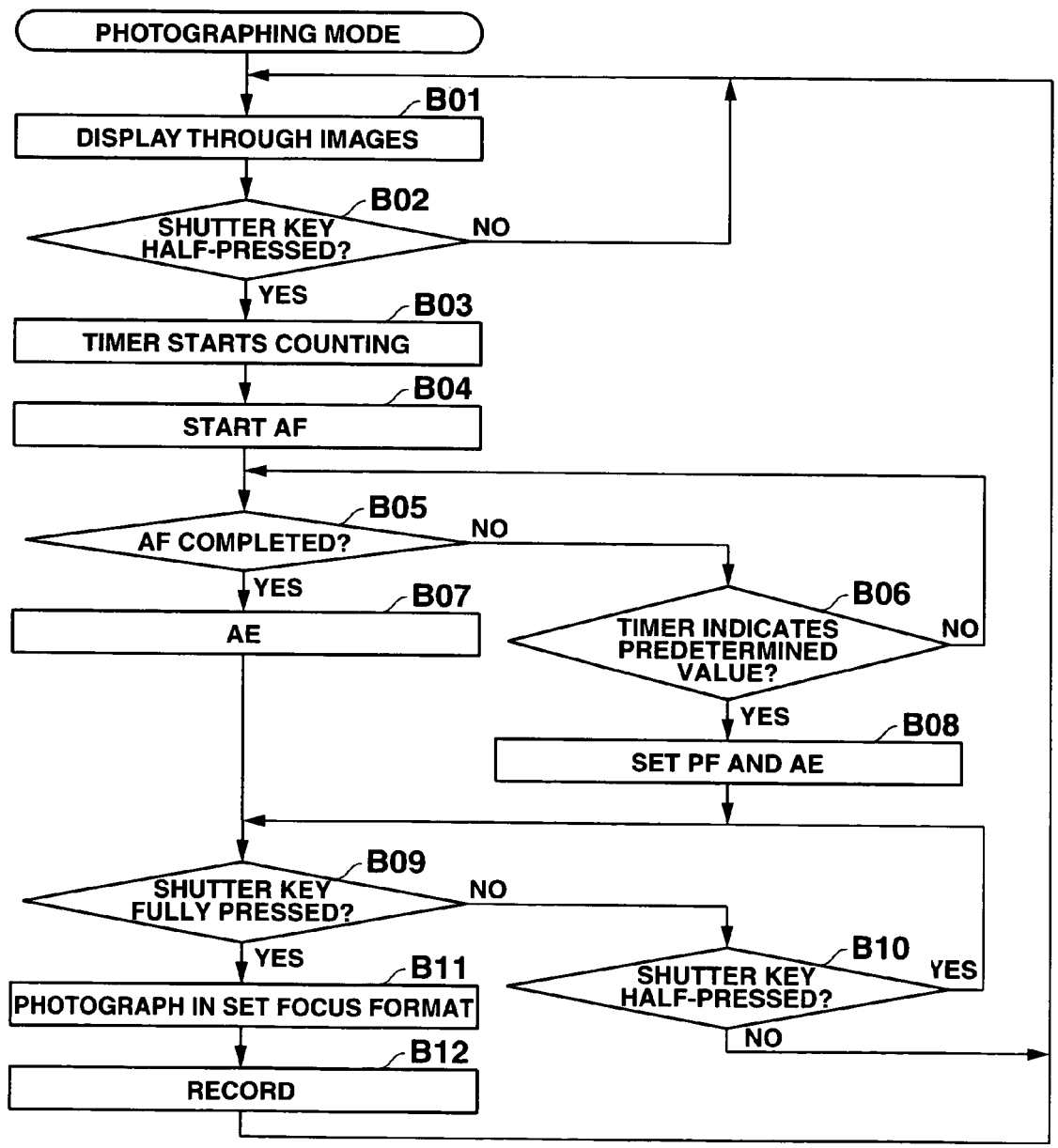
FIG. 5 is a flowchart showing processing contents in a photographing mode according to a second embodiment of the present invention.

FIG. 5 shows contents of processing performed when a still image is captured in a photographing mode. Initially, simple AF processing and AE processing are executed within a predetermined frame rate at the moment, for example, 30 [frames/second], and the CCD 33 is sequentially driven at a high shutter speed considering the frame rate, thereby maintaining a through image display state in which contents imaged by the CCD 33 are displayed on a display section 21 (step B01), and also judging whether or not the shutter key 9 of a key input section 49 has been half-pressed (step B02).

Such processing is repeatedly performed to wait for the shutter key 9 to be in a half-pressed state.

Thus, if the shutter key 9 is half-pressed, this is judged in step B02. Thus, a clocking operation is started by an internal timer in the control unit 42 (step B03), and an AF operation is also started to measure the value of a distance to a subject (step B04).

Subsequently, it is repeatedly judged whether or not this AF operation is completed to obtain the value of the distance to the subject (step B05), or whether or not the internal timer in the control unit 42 registers a constant clocking value, for example, "three (seconds)" (step B06), thus waiting for the AF processing to terminate or the internal timer in the control unit 42 to register a constant clocking value.

Thus, when the AF processing has terminated before the internal timer in the control unit 42 has registered a constant clocking value, this is judged in step B05. Then, a proper exposure value is obtained by the AE processing from a state in which an autofocus position obtained by the AF processing is locked, and an aperture value and a shutter speed are set from the exposure value and locked (step B07).

On the other hand, when the clocking value of the internal timer in the control unit 42 has become constant before completion of the AF processing, it is judged in step B06 that the AF processing in the contrast method is difficult, for example, under a low illumination environment. Thus, a fixed focus is set from a focal distance of the lens optical system 32 set at the moment, and a proper exposure value is obtained by the AE processing, and then an aperture value and a shutter speed are set from the exposure value and locked (step B08).

After the processing in step B07 or B08, it is repeatedly judged this time whether or not the shutter key 9 has been further fully pressed (step B09) or whether or not it is still half-pressed (step B10), thus waiting for the shutter key 9 to be fully pressed while states of an in-focus position and AE are locked or waiting for the half-pressed state to be cancelled.

Here, when the half-press operation for the shutter key 9 is cancelled, this is judged in step B10. Thus, the locking of the in-focus position and AE states is cancelled, and a return is made again to the processing in step B01.

Furthermore, if the shutter key 9 is fully pressed from the state in which the in-focus position and AE states are locked, this is judged in step B09, and a still image is captured while the in-focus position and AE value corresponding to a focusing method set at the moment are locked, thereby obtaining image data (step B11). The obtained data on the still image is compressed and converted into a file in a JPEG circuit 46, and stored/saved on an internal memory 47 or a memory card 48 (step B12). A series of processes regarding the photography thus terminates, and a return is made to the processing in step A01 to again prepare for next photography.

Thus, for example, when accurate contrast detection can not be achieved due to insufficient illumination of the subject in a camera having the autofocus function adopting the contrast method, a switch is automatically made from the autofocus function to the fixed focus as necessary to capture the still image, thereby making it possible to reduce the possibility of missing the right moment to press the shutter and ensuring that the photography is performed.

In this embodiment, a judgment is made particularly from whether or not time required for the autofocus has reached a certain value, so that a judgment result can be obtained in a short time, and a proper response can be made.

It is to be noted that a state in which an accurate focal distance in the AF processing can not be obtained is judged by the time from the start to the termination of the AF processing in the embodiment described above. However, the present invention is not limited thereto. For example, the AE processing may be first performed, and a judgment may be made from the exposure value or the like obtained by the AE processing.

Third Embodiment

A third embodiment in which the present invention is applied to a digital camera will hereinafter be described in reference to the drawings.

It is to be noted that an external configuration of the digital camera is basically similar to that in FIG. 1A and FIG. 1B and a functional configuration of an electronic circuit is basically similar to that in FIG. 2, so that the same numerals are used for the same parts and those parts are not shown and described.

Now, an operation in this embodiment will be described.

It is to be noted that in a digital camera 1, a shutter key 9 has a two-stage operation stroke as in other typical cameras, and a photographing operation is executed on the basis of an operation logic as follows: at a first step, autofocus (AF) processing and automatic exposure (AE) processing are performed in a state generally called half press where the shutter key is pressed down to about half of a full stroke, and individual values in the processing are locked; and at a second step, actual photography is executed with the above AF value and AE value in an operation with a full stroke generally called full press.

Furthermore, photography with a fixed focus described later (referred to as "PF photography" in the drawing) means photography performed by so-called "stop-down" wherein a focus lens is moved to a predetermined position and an aperture (F) value and a shutter speed are read and set on the basis of a lookup table fixedly prestored in a ROM within a control unit 42 in accordance with the focal distance position of the zoom lens selected at the moment, an ISO film speed set at the moment and an AE value (light amount), thereby performing photography by obtaining a state called pan focus (PF) where a depth of field practically covering the whole distance is obtained, or by obtaining a fixed great depth of field close to the above-mentioned depth of field.

Furthermore, when photography is performed with this digital camera 1 using flash emission, that is, when an automatic emission mode of a flash is set and a sufficient illumination for a subject can't be obtained without the flash emission, or when a compulsory emission mode of the flash is set, pre-emission is conducted wherein the flash is pre-flashed before actual light emission of the flash in actual photography, and an amount of light emission in the actual light emission of the flash is corrected in accordance with an amount of light reflected from the subject.

Figure 6:
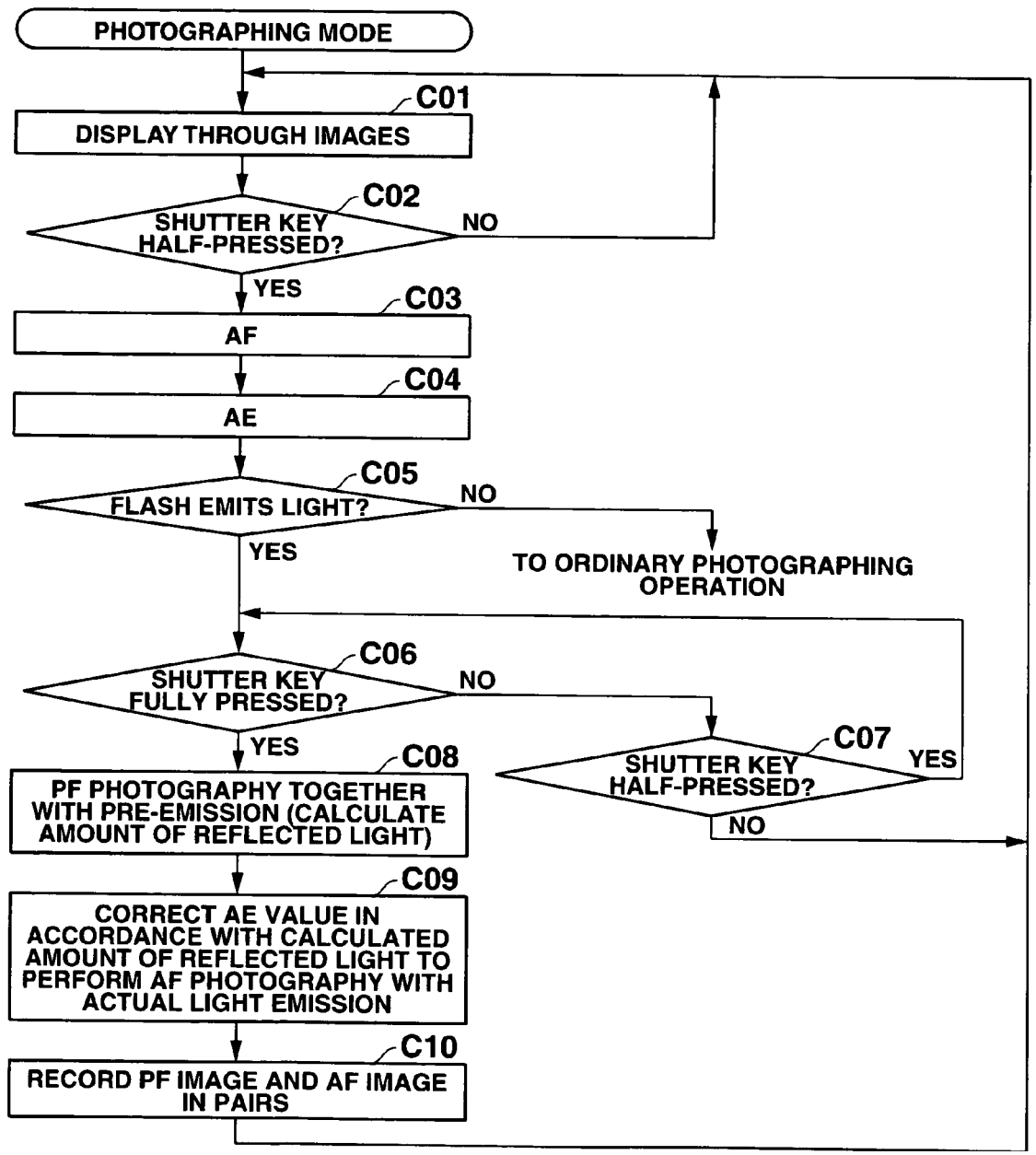
FIG. 6 is a flowchart showing processing contents in a photographing mode according to a third embodiment of the present invention.

FIG. 6 shows contents of processing performed when a still image is captured in a photographing mode. Initially, simple AF processing and AE processing are executed within a predetermined frame rate at the moment, for example, 30 [frames/second], and a CCD 33 is sequentially driven at a high shutter speed considering the frame rate, thereby maintaining a through image display state in which contents imaged by the CCD 33 are displayed on a display section 21 (step C01), and also judging whether or not the shutter key 9 of a key input section 49 has been half-pressed (step C02). Such processing is repeatedly performed to wait for the shutter key 9 to be in a half-pressed state.

Thus, if the shutter key 9 is half-pressed, this is judged in step C02, and the value of a distance to the subject is again accurately measured by the AF processing, and the focal distance value is locked (step C03). A proper exposure value is obtained from a state in which the autofocus position is locked, and an aperture value and a shutter speed are set from the exposure value and locked (step C04).

Subsequently, it is judged whether or not to irradiate auxiliary light by the flash emission during photography in accordance with a flash mode set at this point (step C05).

This judgment is made, if the set flash mode is the automatic emission mode, depending on whether or not the exposure value locked in the AE processing is at such a level that requires the flash emission, or depending on whether or not the flash mode is set to the compulsory emission mode, or depending on whether the flash mode is not set to an emission prohibited mode. As a result, it is judged whether or not to perform photography with the irradiation of the auxiliary light by the flash emission. When it is determined to perform the photography without the flash emission, an ordinary photographing operation will then be performed which is not associated with the present embodiment, so that this operation is not described below.

Furthermore, when the flash mode is the automatic emission mode and the exposure value is at such a level that requires the flash emission, or when the flash mode is set to the compulsory emission mode and the flash emission is therefore performed, this is judged in step C05. Next, it is repeatedly judged whether or not the shutter key 9 is fully pressed (step C06) or whether or not it is still half-pressed (step C07), thus waiting for the shutter key 9 to be fully pressed while states of the AF and AE are locked or waiting for the half-pressed state to be cancelled.

Here, when the half-press operation for the shutter key 9 is cancelled, this is judged in step C07, and a return is made again to the processing in step C01.

Furthermore, if the shutter key 9 is fully pressed from the state in which the AF value and AE value are locked, this is judged in step C06. Thus, the locked state of the AF processing is once cancelled, and the focus lens of a lens optical system 32 is moved to a position which achieves a fixed focus corresponding to a focal distance at that point. In addition, a flash emitting unit 6 is caused to perform pre-emission by a flash drive section 52 in a light emission amount corresponding to the locking of the AE processing, and synchronously with this, a still image is captured with the fixed focus to obtain image data (step C08). At this point, an amount of reflected light for the amount of light emitted by the flash emitting unit 6 is calculated from the obtained image data.

Next, the exposure value locked in the AE processing is corrected in accordance with the calculated amount of reflected light, and the focus lens in the lens optical system 32 is returned to the lock position in the AF processing obtained in step C03, thus performing the actual photography to capture a still image based on the AF processing while causing the flash emitting unit 6 to perform the actual light emission by the flash drive section 52 (step C09).

Then, both obtained data on the still image in the actual photography in accordance with the AF processing and data on the still image in the pre-emission obtained by the fixed focus in step C08 immediately before the AF processing are compressed and converted into files in a JPEG circuit 46, and stored/saved on an internal memory 47 or a memory card 48 (step C10). A series of processes regarding the photography thus terminates, and a return is made to the processing in step C01 to again prepare for next photography.

Thus, when flash photography is performed using the flash emitting unit 6, the pre-emission in the flash photography is effectively utilized to obtain a still image based on the fixed focus, and this still image is stored/saved to be paired with the still image based on the autofocus captured during the actual photography after the pre-emission. Therefore, unnecessary consumption of electric power from a power source battery whose capacity is limited is avoided without wasting emission/driving of the flash emitting unit 6. In the meantime, even when the still image captured by actuation of an autofocus function is out of focus or blurred due to a factor such as hand movement, it is highly likely that the still image captured with the fixed focus using the pre-emission immediately before the autofocus photography is sufficiently vivid. This makes it possible to avoid a situation where a blurred image can only be obtained at a rare moment to press the shutter and ensuring that the still image focused on the desired subject is captured and stored.

Fourth Embodiment

A fourth embodiment in which the present invention is applied to a digital camera will hereinafter be described in reference to the drawings.

It is to be noted that an external configuration of the digital camera is basically similar to that in FIG. 1A and FIG. 1B and a functional configuration of an electronic circuit is basically similar to that in FIG. 2, so that the same numerals are used for the same parts and those parts are not shown and described.

Now, an operation in this embodiment will be described.

It is to be noted that in a digital camera 1, a shutter key 9 has a two-stage operation stroke as in other typical cameras, and a photographing operation is executed on the basis of an operation logic as follows: at a first step, autofocus (AF) processing and automatic exposure (AE) processing are performed in a state generally called half press where the shutter key is pressed down to about half of a full stroke, and individual values in the processing are locked; and at a second step, actual photography is executed with the above AF value and AE value in an operation with a full stroke generally called full press.

Furthermore, photography with a fixed focus described later (referred to as "PF photography" in the drawing) means photography performed by so-called "stop-down" wherein a focus lens is moved to a predetermined position and an aperture (F) value and a shutter speed are read and set on the basis of a lookup table fixedly prestored in a ROM within a control unit 42 in accordance with the focal distance position of the zoom lens selected at the moment, an ISO film speed set at the moment and an AE value (light amount), thereby performing photography by obtaining a state called pan focus (PF) where a depth of field practically covering the whole distance is obtained, or by obtaining a fixed great depth of field close to the above-mentioned depth of field.

Figure 7:
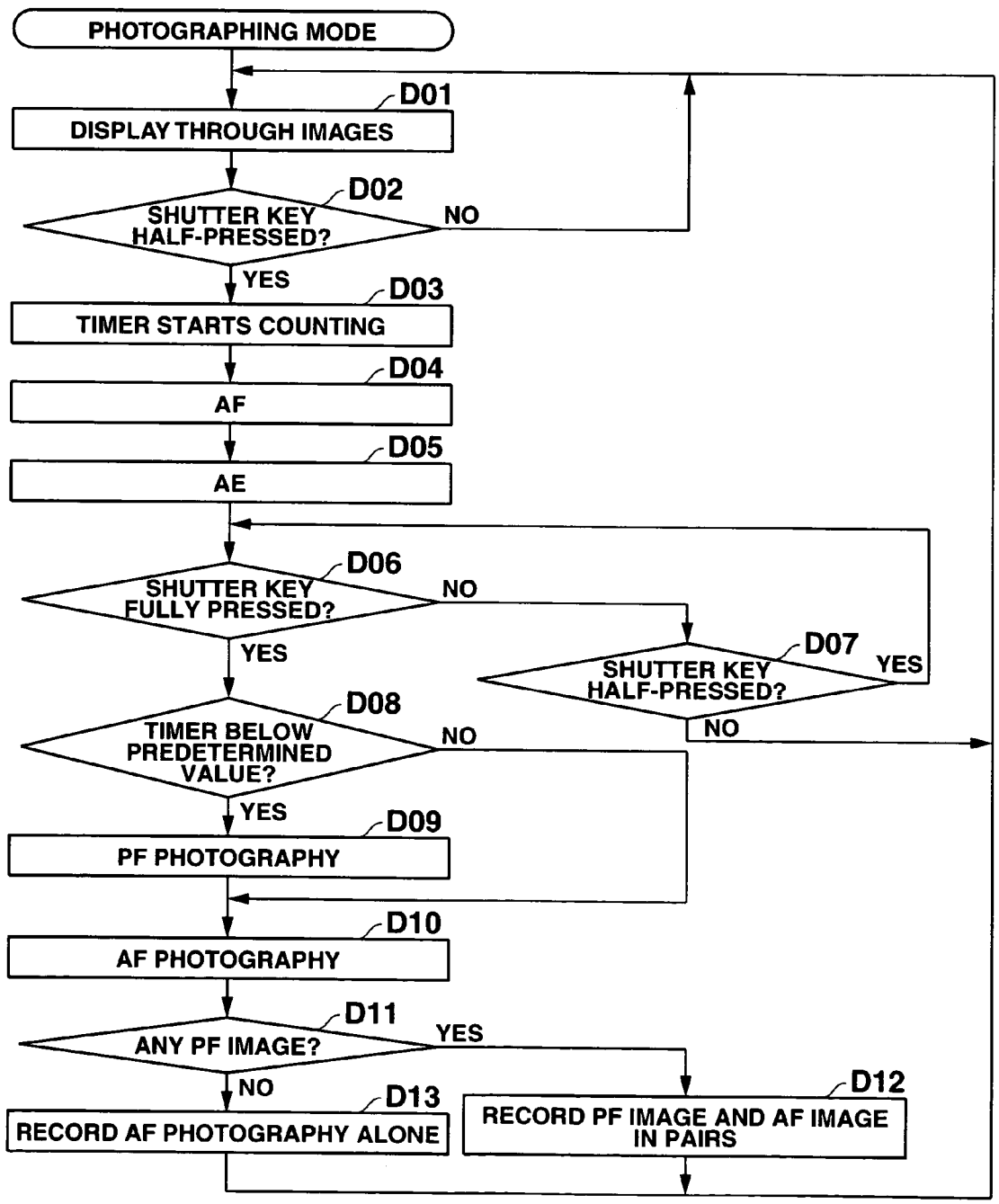
FIG. 7 is a flowchart showing processing contents in a photographing mode according to a fourth embodiment of the present invention.

FIG. 7 shows contents of processing performed when a still image is captured in a photographing mode. Initially, simple AF processing and AE processing are executed within a predetermined frame rate at the moment, for example, 30 [frames/second], and a CCD 33 is sequentially driven at a high shutter speed considering the frame rate, thereby maintaining a through image display state in which contents imaged by the CCD 33 are displayed on a display section 21 (step D01), and also judging whether or not the shutter key 9 of a key input section 49 has been half-pressed (step D02). Such processing is repeatedly performed to wait for the shutter key 9 to be in a half-pressed state.

Thus, if the shutter key 9 is half-pressed, this is judged in step D02. First, clocking by an internal timer in the control unit 42 is started (step D03), and the value of a distance to a subject is accurately measured, and the focal distance value is locked (step D04).

In addition, a proper exposure value is obtained from a state in which the autofocus position is locked, and an aperture value and a shutter speed are set from the exposure value and locked (step D05). Then, it is repeatedly judged whether or not the shutter key 9 has been further fully pressed (step D06) or whether or not it is still half-pressed (step D07), thus waiting for the shutter key 9 to be fully pressed while states of the AF and AE are locked or waiting for the half-pressed state to be cancelled.

Here, when the half-press operation for the shutter key 9 is cancelled, this is judged in step D07, and a return is made again to the processing in step D01 concluding that the actual photography has not been reached.

Furthermore, if the shutter key 9 is fully pressed from the state in which the AF value and AE value are locked, this is judged in step D06. Thus, depending on whether or not a clocking value of the internal timer in the control unit 42 is a predetermined value, for example, "0.5 seconds", it is judged whether the shutter key 9 is fully pressed at a time (step D08).

Here, only when it is judged that the clocking value of the internal timer in the control unit 42 is below the predetermined value and that the shutter key 9 has been fully pressed at a time, the locked state of the AF is temporarily cancelled. The position of the focus lens is moved in accordance with the position of the zoom lens of the lens optical system 32 at the moment, and stop-down setting is performed in accordance with the locked AE value. Thus, photography is performed with a fixed focus allowing a fixed great depth of field to be obtained, and an obtained image is retained in a DRAM 41 (step D09).

Subsequently, regardless of whether the photography has been performed with the fixed focus in step D09, a still image is captured in a state where photographing conditions based on the AF processing and AE processing remain locked to obtain image data (step D10).

Next, it is judged whether or not the data on the still image reproduced with the fixed focus is retained in the DRAM 41 (step D11). If it is not retained, the data on the still image captured with the autofocus alone is compressed and converted into a file in a JPEG circuit 46, and stored/saved on an internal memory 47 or a memory card 48 (step D13). A series of processes regarding the photography thus terminates, and a return is made to the processing in step C01 to again prepare for next photography.

On the other hand, when it is judged in step D11 that the data on the still image reproduced with the fixed focus is retained in the DRAM 41, both data on the still image obtained with the autofocus and the data on the still image obtained by the fixed focus in step D09 are compressed and converted into files in the JPEG circuit 46, and stored/saved on the internal memory 47 or the memory card 48 (step D12). A series of processes regarding the photography thus terminates, and a return is made to the processing in step D01 to again prepare for next photography.

Thus, proper time is set to judge time required for the operation of the shutter key 9 to detect a rapid full press of the shutter key 9, thus obtaining a still image based on the fixed focus and a still image based on the autofocus. Therefore, even when the still image captured by the actuation of the autofocus function is out of focus or blurred due to a factor such as hand movement, it is highly likely that the still image captured with the fixed focus immediately before the autofocus photography is sufficiently vivid. This makes it possible to avoid a situation where a blurred image can only be obtained at a rare moment to press the shutter and ensuring that the still image focused on the desired subject is captured and stored.

Fifth Embodiment

A fifth embodiment in which the present invention is applied to a digital camera will hereinafter be described in reference to the drawings.

It is to be noted that an external configuration of the digital camera is basically similar to that in FIG. 1A and FIG. 1B and a functional configuration of an electronic circuit is basically similar to that in FIG. 2, so that the same numerals are used for the same parts and those parts are not shown and described.

Now, an operation in this embodiment will be described.

It is to be noted that in a digital camera 1, a shutter key 9 has a two-stage operation stroke as in other typical cameras, and a photographing operation is executed on the basis of an operation logic as follows: at a first step, autofocus (AF) processing and automatic exposure (AE) processing are performed in a state generally called half press where the shutter key is pressed down to about half of a full stroke, and individual values in the processing are locked; and at a second step, actual photography is executed with the above AF value and AE value in an operation with a full stroke generally called full press.

Furthermore, photography with a fixed focus described later (referred to as "PF photography" in the drawing) means photography performed by so-called "stop-down" wherein a focus lens is moved to a predetermined position and an aperture (F) value and a shutter speed are read and set on the basis of a lookup table fixedly prestored in a ROM within a control unit 42 in accordance with the focal distance position of the zoom lens selected at the moment, an ISO film speed set at the moment and an AE value (light amount), thereby performing photography by obtaining a state called pan focus (PF) where a depth of field practically covering the whole distance is obtained, or by obtaining a fixed great depth of field close to the above-mentioned depth of field.

Figure 8:
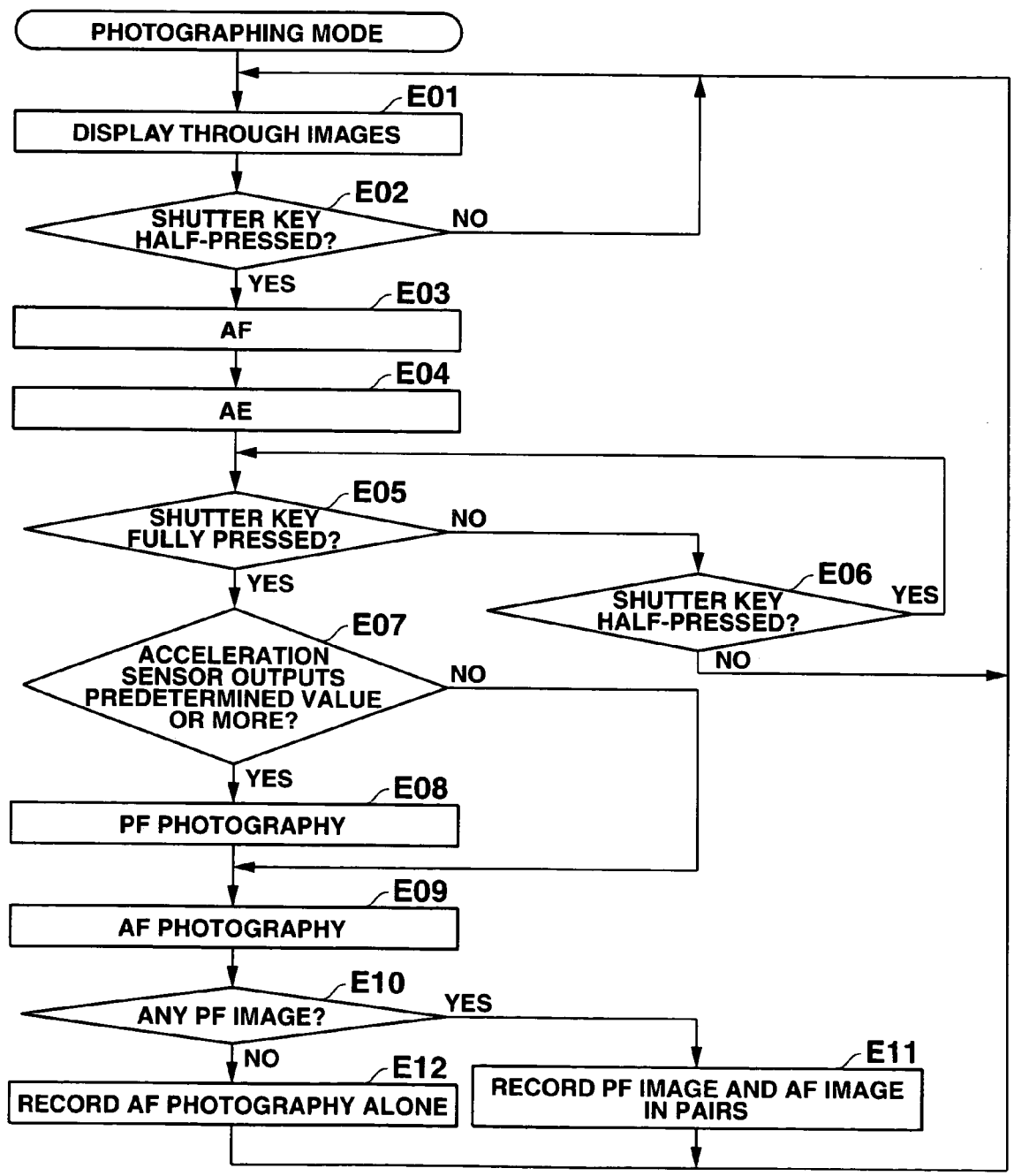
FIG. 8 is a flowchart showing processing contents in a photographing mode according to a fifth embodiment of the present invention.

FIG. 8 shows contents of processing performed when a still image is captured in a photographing mode. Initially, simple AF processing and AE processing are executed within a predetermined frame rate at the moment, for example, 30 [frames/second], and a CCD 33 is sequentially driven at a high shutter speed considering the frame rate, thereby maintaining a through image display state in which contents imaged by the CCD 33 are displayed on a display section 21 (step E01), and also judging whether or not the shutter key 9 of a key input section 49 has been half-pressed (step E02). Such processing is repeatedly performed to wait for the shutter key 9 to be in a half-pressed state.

Thus, if the shutter key 9 is half-pressed, this is judged in step E02. The value of a distance to a subject is accurately measured, and the focal distance value is locked (step E03).

In addition, a proper exposure value is obtained from a state in which the autofocus position is locked, and an aperture value and a shutter speed are set from the exposure value and locked (step E04). Then, it is repeatedly judged whether or not the shutter key 9 has been further fully pressed (step E05) or whether or not it is still half-pressed (step E06), thus waiting for the shutter key 9 to be fully pressed while states of the AF and AE are locked or waiting for the half-pressed state to be cancelled.

Here, when the half-press operation for the shutter key 9 is cancelled, this is judged in step E06, and a return is made again to the processing in step E01 concluding that the actual photography has not been reached.

Furthermore, if the shutter key 9 is fully pressed from the state in which the AF value and AE value are locked, this is judged in step E05. An output level of an acceleration sensor 51 at the moment is detected, and depending on whether or not a value thereof is above a certain value which makes it possible to judge in advance that hand movement has occurred, it is judged whether or not there is a possibility of the hand movement due to the full-press operation of the shutter key 9 (step E07).

Here, only when it is judged that the output level of the acceleration sensor 51 is above a certain value and that there is a possibility of the hand movement, the locked state of the AF is temporarily cancelled. The position of the focus lens is moved in accordance with the position of the zoom lens of the lens optical system 32 at the moment, and stop-down setting is performed in accordance with the locked AE value. Thus, photography is performed with a fixed focus allowing a fixed great depth of field to be obtained, and an obtained image is retained in a DRAM 41 (step E08).

Subsequently, regardless of whether or not the photography has been performed with the fixed focus in step E08, a still image is captured in a state where photographing conditions based on the AF processing and AE processing remain locked to obtain image data (step E09).

Next, it is judged whether or not the data on the still image reproduced with the fixed focus is retained in the DRAM 41 (step E10). If it is not retained, the data on the still image captured with the autofocus alone is compressed and converted into a file in a JPEG circuit 46, and stored/saved on an internal memory 47 or a memory card 48 (step E12). A series of processes regarding the photography thus terminates, and a return is made to the processing in step E01 to again prepare for next photography.

On the other hand, when it is judged in step E10 that the data on the still image reproduced with the fixed focus is retained in the DRAM 41, both data on the still image obtained with the autofocus and the data on the still image obtained by the fixed focus in step E09 are compressed and converted into files in the JPEG circuit 46, and stored/saved on the internal memory 47 or the memory card 48 (step E11). A series of processes regarding the photography thus terminates, and a return is made to the processing in step E01 to again prepare for next photography.

Thus, when the hand movement is detected from the output level of the acceleration sensor 51, the still image based on the fixed focus and the still image based on the autofocus are obtained. Therefore, even when the still image based on the autofocus is blurred due to the hand movement, it is likely that the still image based on the fixed focus is not affected, thereby allowing an error in the photography to be erased and ensuring that the still image focused on the desired subject is captured and stored.

It is to be noted that in the embodiment described above, the acceleration sensor 51 is used to detect a state blurred by the hand movement. However, the present invention is not limited thereto, and a sensor such as a gyro sensor may be used instead.

Sixth Embodiment

A sixth embodiment in which the present invention is applied to a digital camera will hereinafter be described in reference to the drawings.

It is to be noted that an external configuration of the digital camera is basically similar to that in FIG. 1A and FIG. 1B and a functional configuration of an electronic circuit is basically similar to that in FIG. 2, so that the same numerals are used for the same parts and those parts are not shown and described.

Now, an operation in this embodiment will be described.

It is to be noted that in a digital camera 1, a shutter key 9 has a two-stage operation stroke as in other typical cameras, and a photographing operation is executed on the basis of an operation logic as follows: at a first step, autofocus (AF) processing and automatic exposure (AE) processing are performed in a state generally called half press where the shutter key is pressed down to about half of a full stroke, and individual values in the processing are locked; and at a second step, actual photography is executed with the above AF value and AE value in an operation with a full stroke generally called full press.

Furthermore, photography with a fixed focus described later (referred to as "PF photography" in the drawing) means photography performed by so-called "stop-down" wherein a focus lens is moved to a predetermined position and an aperture (F) value and a shutter speed are read and set on the basis of a lookup table fixedly prestored in a ROM within a control unit 42 in accordance with the focal distance position of the zoom lens selected at the moment, an ISO film speed set at the moment and an AE value (light amount), thereby performing photography by obtaining a state called pan focus (PF) where a depth of field practically covering the whole distance is obtained, or by obtaining a fixed great depth of field close to the above-mentioned depth of field.

Furthermore, when photography is performed with this digital camera 1 using flash light emission, that is, when an automatic emission mode of a flash is set and a sufficient illumination for a subject can not be obtained without the flash light emission, or when a compulsory emission mode of the flash is set, pre-emission is conducted wherein the flash is caused to emit light before actual light emission of the flash in actual photography, and an amount of light emission in the actual light emission of the flash is corrected in accordance with an amount of light reflected from the subject.

Moreover, in this photographing mode, a user selects and sets in advance to perform photography with the fixed focus simultaneously with the pre-emission of the flash or to perform photography with the fixed focus prior to the pre-emission (without the flash light emission).

Figure 9:
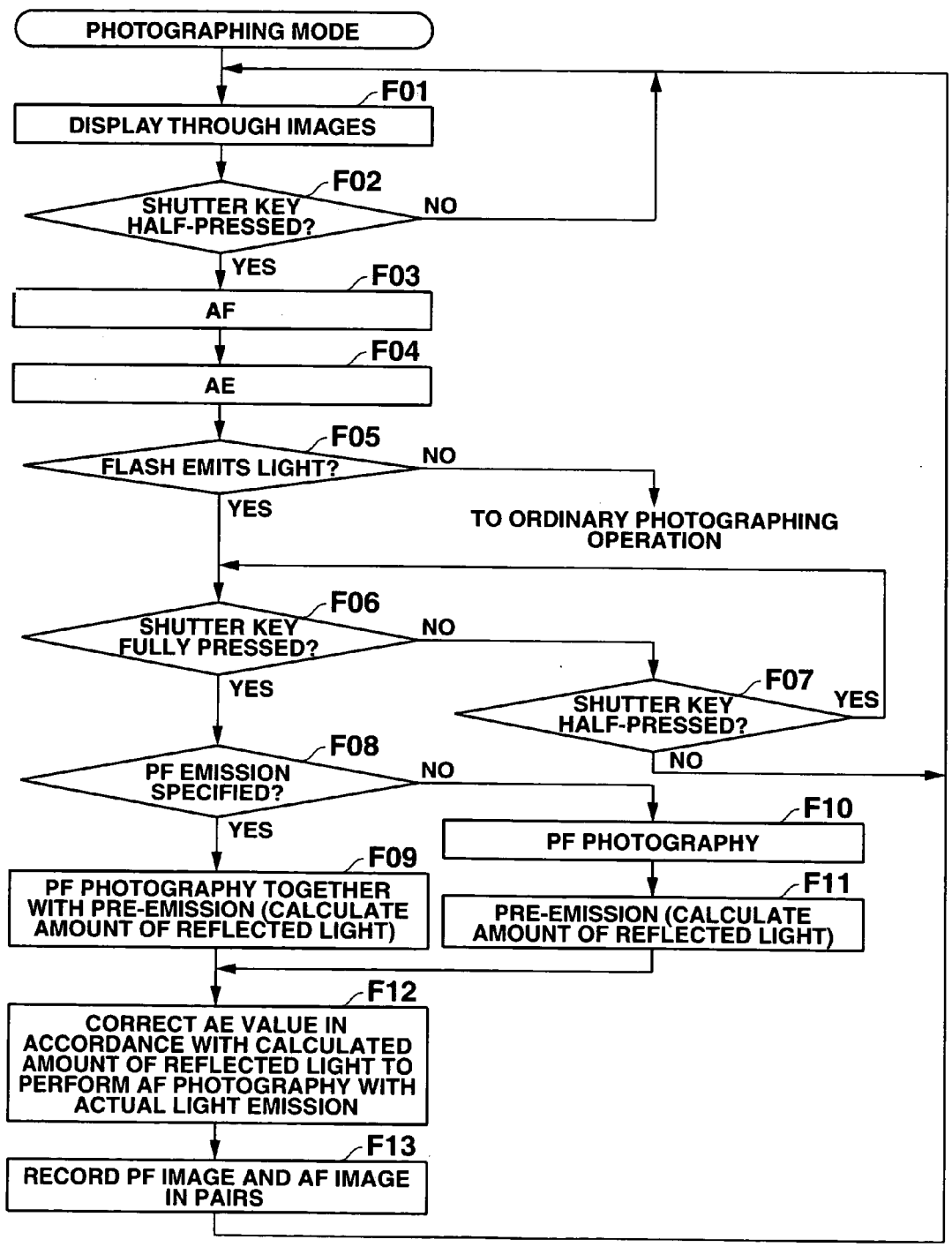
FIG. 9 is a flowchart showing processing contents in a photographing mode according to a sixth embodiment of the present invention.

FIG. 9 shows contents of processing performed when a still image is captured in the photographing mode. Initially, simple AF processing and AE processing are executed within a predetermined frame rate at the moment, for example, 30 [frames/second], and a CCD 33 is sequentially driven at a high shutter speed considering the frame rate, thereby maintaining a through image display state in which contents imaged by the CCD 33 are displayed on a display section 21 (step F01), and also judging whether or not the shutter key 9 of a key input section 49 has been half-pressed (step F02). Such processing is repeatedly performed to wait for the shutter key 9 to be in a half-pressed state.

Thus, if the shutter key 9 is half-pressed, this is judged in step F02, and the value of a distance to the subject is again accurately measured by the AF processing, and the focal distance value is locked (step F03). A proper exposure value is obtained from a state in which the autofocus position is locked, and an aperture value and a shutter speed are set from the exposure value and locked (step F04).

Subsequently, it is judged whether or not to irradiate auxiliary light by the flash light emission during photography in accordance with a flash mode set at this point (step F05).

This judgment is made, if the set flash mode is the automatic emission mode, depending on whether or not the exposure value locked in the AE processing is at such a level that requires the flash light emission, or depending on whether or not the flash mode is set to the compulsory emission mode, or depending on whether the flash mode is not set to an emission prohibited mode. As a result, it is judged whether or not to perform photography with the irradiation of the auxiliary light by the flash light emission. When it is determined to perform the photography without the flash light emission, an ordinary photographing operation will be performed which is not associated with the present embodiment, so that this operation is not described below.

Furthermore, when the flash mode is the automatic emission mode and the exposure value is at such a level that requires the flash light emission, or when the flash mode is set to the compulsory emission mode and the flash light emission is therefore performed, this is judged in step F05. Next, it is repeatedly judged whether or not the shutter key 9 is fully pressed (step F06) or whether or not it is still half-pressed (step F07), thus waiting for the shutter key 9 to be fully pressed while states of the AF and AE are locked or waiting for the half-pressed state to be cancelled.

Here, when the half-press operation for the shutter key 9 is cancelled, this is judged in step F07, and a return is made again to the processing in step F01.

Furthermore, if the shutter key 9 is fully pressed from the state in which the AF value and AE value are locked, this is judged in step F06. Then, it is judged whether or not it is selected and set to capture a still image with the fixed focus simultaneously with the pre-emission of a flash light emitting unit 6 (step F08).

Here, when it is judged that it is selected and set to capture a still image simultaneously with the pre-emission, the locked state of the AF processing is once cancelled, and a focus lens in a lens optical system 32 is moved to a position which achieves a fixed focus corresponding to a focal distance at that point. In addition, a flash light emitting unit 6 is caused to perform pre-emission by a flash drive section 52 in a light emission amount corresponding to the locking of the AE processing, and synchronously with this, a still image is captured with the fixed focus to obtain image data (step F09). At this point, an amount of reflected light for the amount of light emitted by the flash light emitting unit 6 is calculated from the obtained image data.

Furthermore, when it is judged that it is selected and set not to perform photography simultaneously with the pre-emission in step F08, the locked state of the AF processing is once cancelled, and the focus lens in the lens optical system 32 is moved to the position which achieves the fixed focus corresponding to the focal distance at that point. In addition, the photography with the fixed focus is performed in accordance with the locking of the AE processing without the pre-emission of the flash light emitting unit 6 to obtain image data, and the obtained image data is retained in a DRAM 41 (step F10).

Subsequently, the flash light emitting unit 6 is caused to perform the pre-emission by the flash drive section 52, and an amount of reflected light for the amount of light emitted by the flash light emitting unit 6 is calculated (step F11).

After the processing in step F09 or F11, the exposure value locked in the AE processing is corrected by the pre-emission in accordance with the calculated amount of reflected light, and the focus lens in the lens optical system 32 is returned to the lock position in the AF processing obtained in step F03, thus performing the actual photography for a still image based on the AF processing while causing the flash light emitting unit 6 to perform the actual light emission by the flash drive section 52 (step F12).

Then, both obtained data on the still image in the actual photography in accordance the AF processing and data on the still image obtained by the fixed focus in step F09 or F10 immediately before the AF processing are compressed and converted into files in a JPEG circuit 46, and stored/saved on an internal memory 47 or a memory card 48 (step F13). A series of processes regarding the photography thus terminates, and a return is made to the processing in step F01 to again prepare for next photography.

Thus, when flash photography is performed using the flash light emitting unit 6, the photography with the fixed focus is performed during or off the pre-emission in accordance with the selection and setting of the user, and the image is stored/saved to be paired with the still image based on the autofocus captured during the actual photography after the pre-emission. Therefore, even when the still image captured by the actuation of the autofocus function is out of focus or blurred due to a factor such as hand movement, it is highly likely that the still image captured with the fixed focus by use of the pre-emission immediately before the autofocus photography is sufficiently vivid. This makes it possible to avoid a situation where a blurred image can only be obtained at a rare moment to press the shutter and ensuring that the still image focused on the desired subject is captured and stored.

In addition, the still image is captured with the fixed focus during or off the pre-emission in accordance with the selection and setting of the user, so that it is possible to obtain a still image with the fixed focus in such a manner as to accurately reflect the intent of the user.

Seventh Embodiment

A seventh embodiment in which the present invention is applied to a digital camera will hereinafter be described in reference to the drawings.

It is to be noted that an external configuration of the digital camera is basically similar to that in FIG. 1A and FIG. 1B and a functional configuration of an electronic circuit is basically similar to that in FIG. 2, so that the same numerals are used for the same parts and those parts are not shown and described.

Now, an operation in this embodiment will be described.

It is to be noted that in a digital camera 1, a shutter key 9 has a two-stage operation stroke as in other typical cameras, and a photographing operation is executed on the basis of an operation logic as follows: at a first step, autofocus (AF) processing and automatic exposure (AE) processing are performed in a state generally called half press where the shutter key is pressed down to about half of a full stroke, and individual values in the processing are locked; and at a second step, actual photography is executed with the above AF value and AE value in an operation with a full stroke generally called full press.

Furthermore, photography with a fixed focus described later (referred to as "PF photography" in the drawing) means photography performed by so-called "stop-down" wherein a focus lens is moved to a predetermined position and an aperture (F) value and a shutter speed are read and set on the basis of a lookup table fixedly prestored in a ROM within a control unit 42 in accordance with the focal distance position of the zoom lens selected at the moment, an ISO film speed set at the moment and an AE value (light amount), thereby performing photography by obtaining a state called pan focus (PF) where a depth of field practically covering the whole distance is obtained, or by obtaining a fixed great depth of field close to the above-mentioned depth of field.

Moreover, this digital camera 1 allows photography for a still image based on a manual focus (referred to as "MF" in the drawing) to focus at an arbitrary set distance value, in addition to the photography for a still image based on the autofocus and the photography for a still image based on the fixed focus. When a user specifies the photography based on the manual focus, a still image is captured on the basis of a focal distance value set in a range from a shortest photographing distance to infinity in which a lens optical system 32 can focus.

Figure 10:
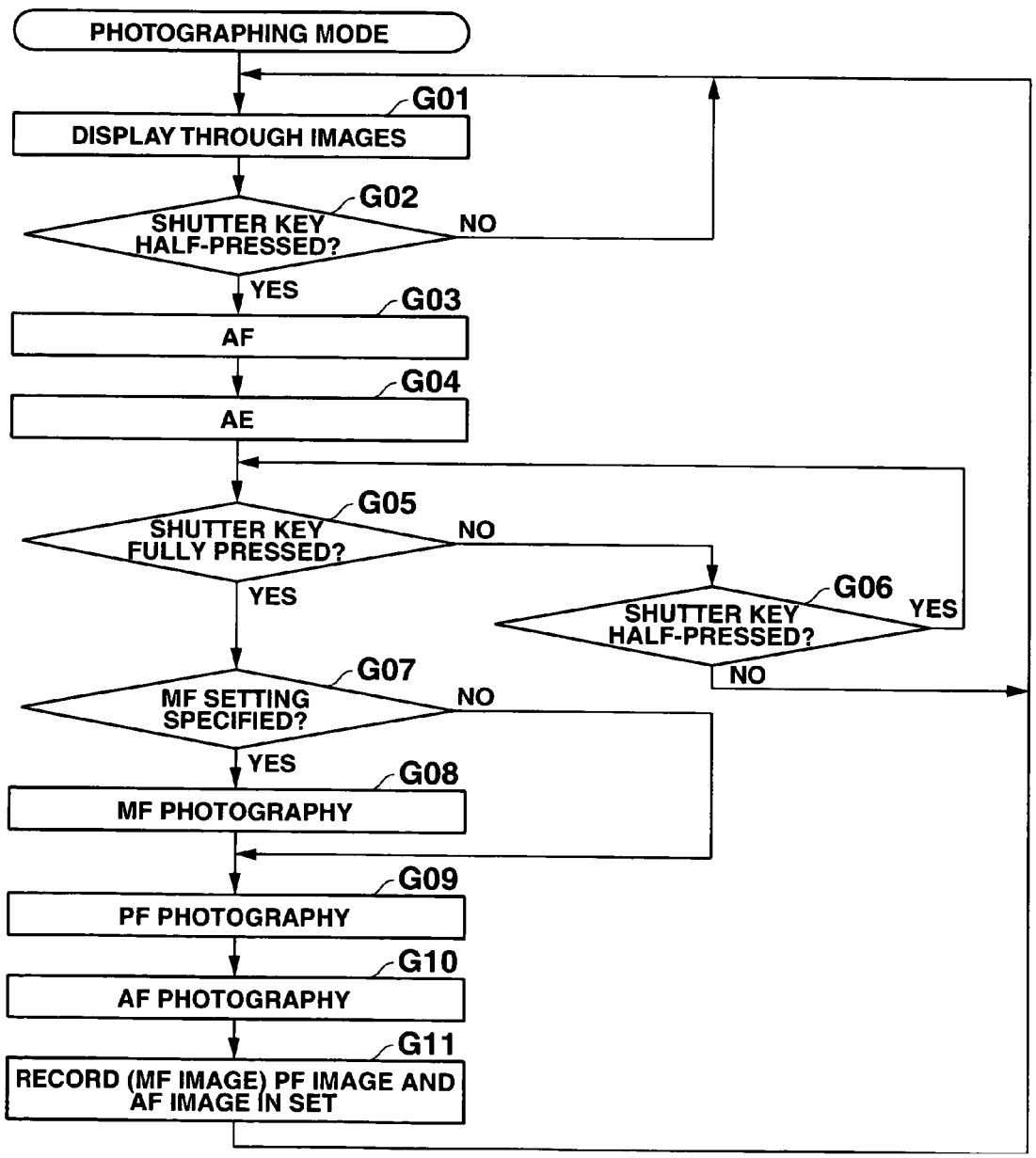
FIG. 10 is a flowchart showing processing contents in a photographing mode according to a seventh embodiment of the present invention.

FIG. 10 shows contents of processing performed when a still image is captured in the photographing mode. Initially, simple AF processing and AE processing are executed within a predetermined frame rate at the moment, for example, 30 [frames/second], and a CCD 33 is sequentially driven at a high shutter speed considering the frame rate, thereby maintaining a through image display state in which contents imaged by the CCD 33 are displayed on a display section 21 (step G01), and also judging whether or not the shutter key 9 of a key input section 49 has been half-pressed (step G02). Such processing is repeatedly performed to wait for the shutter key 9 to be in a half-pressed state.

Thus, if the shutter key 9 is half-pressed, this is judged in step G02, and the value of a distance to the subject is again accurately measured by the AF processing, and the focal distance value is locked (step G03). A proper exposure value is obtained from a state in which the autofocus position is locked, and an aperture value and a shutter speed are set from the exposure value and locked (step G04).

Subsequently, it is repeatedly judged whether or not the shutter key 9 is fully pressed (step G05) or whether or not it is still half-pressed (step G06), thus waiting for the shutter key 9 to be fully pressed while states of the AF and AE are locked or waiting for the half-pressed state to be cancelled.

Here, when the half-press operation for the shutter key 9 is cancelled, this is judged in step G06, and a return is made again to the processing in step G01.

Furthermore, if the shutter key 9 is fully pressed from the state in which the AF value and AE value are locked, this is judged in step G06. Then, it is judged whether or not the manual focus has been previously specified (step G07).

Here, only when it is judged that the manual focus has been specified, the locked state of the AF processing is once cancelled, and a focus lens in the lens optical system 32 is moved to a specified in-focus position for the manual focus. Thus, a still image is captured to obtain image data, and the obtained image data is retained in a DRAM 41 (step G08).

Subsequently, the focus lens in the lens optical system 32 is moved to a position which achieves the fixed focus corresponding to the focal distance at that point. Thus, a still image based on the fixed focus is captured to obtain image data, and the obtained image data is retained in the DRAM 41 (step G09).

Furthermore, the focus lens in the lens optical system 32 is returned to the lock position in the AF processing obtained in step G03, thus performing the actual photography for a still image based on the AF processing (step G10).

Thus, obtained data on the still image in accordance the AF processing and data on the still image obtained by the fixed focus in step G09 immediately before the AF processing, as well as the image data when a still image has been captured with the manual focus in step G08, are compressed and converted into files in a JPEG circuit 46, and stored/saved in a set on an internal memory 47 or a memory card 48 (step G11). A series of processes regarding the photography thus terminates, and a return is made to the processing in step G01 to again prepare for next photography.

Thus, the setting of the manual focus including the infinity specified by the user is utilized, so that when the manual focus is set, photography for a still image at a manual focus position and photography for a still image with the fixed focus are performed prior to photography for a still image with the autofocus, and image data in these operations are stored/saved in a set. Therefore, even when the still image captured by the actuation of the autofocus function is out of focus or blurred due to a factor such as hand movement, it is highly likely that the still image captured in the manual focus setting and the still image captured with the fixed focus by use of the pre-emission immediately before the autofocus photography are sufficiently vivid. This makes it possible to avoid a situation where a blurred image can only be obtained at a rare moment to press the shutter and ensuring that the still image accurately reflecting the photographic intent of the user is captured and stored.

It is to be noted that in the embodiment described above, when the manual focus is set by the user, a maximum of three still images in total is captured including a still image based on the manual focus, a still image based on the fixed focus and a still image based on the autofocus, and these are stored in a set. However, the present invention is not limited thereto, a still image may be captured at an in-focus position set by the manual focus instead of the still image obtained with the autofocus, and data on this still image may be stored to be paired with the data on the still image obtained with the autofocus.

In addition, the photography with the fixed focus in step G09 and the AF photography in step G10 may be performed in reverse order.

Eighth Embodiment

An eighth embodiment in which the present invention is applied to a digital camera will hereinafter be described in reference to the drawings.

It is to be noted that an external configuration of the digital camera is basically similar to that in FIG. 1A and FIG. 1B and a functional configuration of an electronic circuit is basically similar to that in FIG. 2, so that the same numerals are used for the same parts and those parts are not shown and described.

Now, an operation in this embodiment will be described.

It is to be noted that in a digital camera 1, a shutter key 9 has a two-stage operation stroke as in other typical cameras, and a photographing operation is executed on the basis of an operation logic as follows: at a first step, autofocus (AF) processing and automatic exposure (AE) processing are performed in a state generally called half press where the shutter key is pressed down to about half of a full stroke, and individual values in the processing are locked; and at a second step, actual photography is executed with the above AF value and AE value in an operation with a full stroke generally called full press.

Furthermore, photography with bracketing described later is performed in the following manner: one of the various photographing conditions including an exposure value in the digital camera is selected, such as an in-focus position, a white balance, chroma, sharpness or contrast, and its variable step width and a total number of images captured are specified, thereby sequentially capturing still images under different photographing conditions in stages.

For example, in a case where the exposure value is specified as a photographing condition to execute a representative bracketing function heretofore been referred to as autobracket, suppose that, for example, the variable step width is "½ [EV]" and the total number of images captured is "five". Then, still images will be sequentially captured whose exposures are corrected in five stages in total: "−1.0 [EV]", "−0.5

[EV]", "0 [EV]" "+0.5 [EV]", and "+1.0 [EV]" provided that a proper exposure value obtained in the AE processing is "0 [EV]".

Thus, in the present embodiment, a user arbitrarily specifies the photographing condition as required, and its variable step width and the total number of images captured are specified, such that the bracketing photography is performed to capture still images while changing the photographing conditions in stages for the number of images sequentially captured.

Figure 11:
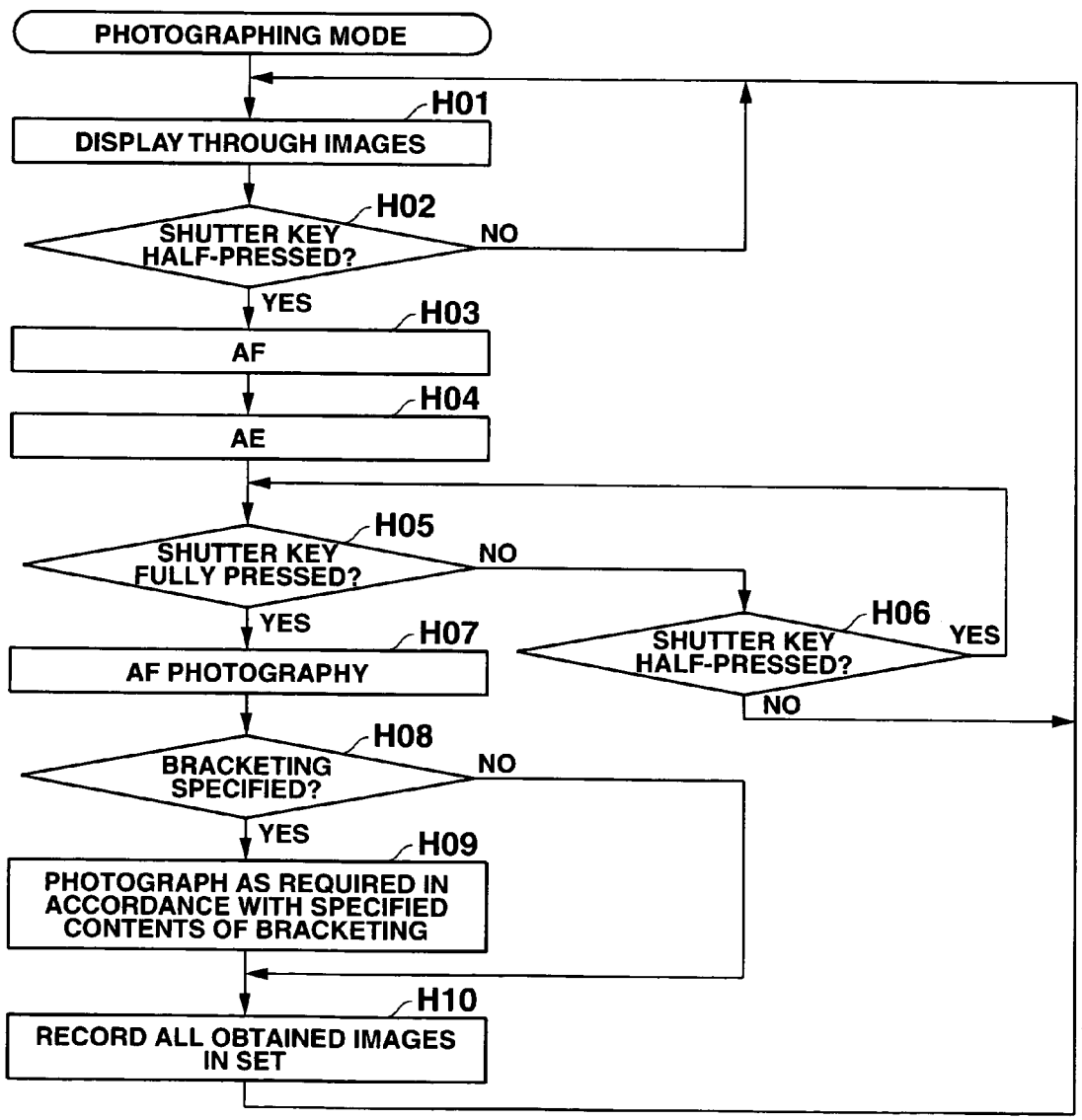
FIG. 11 is a flowchart showing processing contents in a photographing mode according to an eighth embodiment of the present invention.

FIG. 11 shows contents of processing performed when a still image is captured in the photographing mode. Initially, simple AF processing and AE processing are executed within a predetermined frame rate at the moment, for example, 30 [frames/second], and a CCD 33 is sequentially driven at a high shutter speed considering the frame rate, thereby maintaining a through image display state in which contents imaged by the CCD 33 are displayed on a display section 21 (step H01), and also judging whether or not the shutter key 9 of a key input section 49 has been half-pressed (step H02). Such processing is repeatedly performed to wait for the shutter key 9 to be in a half-pressed state.

Thus, if the shutter key 9 is half-pressed, this is judged in step H02, and the value of a distance to a subject is again accurately measured by the AF processing, and the focal distance value is locked (step H03). A proper exposure value is obtained from a state in which the autofocus position is locked, and an aperture value and a shutter speed are set from the exposure value and locked (step H04).

Subsequently, it is repeatedly judged whether or not the shutter key 9 has been further fully pressed (step H05) or whether or not it is still half-pressed (step H06), thus waiting for the shutter key 9 to be fully pressed while states of the AF and AE are locked or waiting for the half-pressed state to be cancelled.

Here, when the half-press operation for the shutter key 9 is cancelled, this is judged in step H06, and a return is made again to the processing in step H01.

Furthermore, if the shutter key 9 is fully pressed from a state in which the AF value and AE value are locked, this is judged in step H05. A still image is immediately captured from a state in which the states of the AF and AE are locked, and obtained data are retained in a DRAM 41 (step H07).

Next, it is judged whether or not the bracketing has been previously specified by the user (step H08). Only when it is judged that the bracketing has been specified, still images under the different photographing conditions are sequentially captured in stages in accordance with the specified contents of bracketing, and obtained data are retained in a DRAM 41 (step H09).

Then, after the photography has entirely terminated, data on all the still images retained in the DRAM 41 are compressed and converted into files in a JPEG circuit 46, and stored/saved on an internal memory 47 or a memory card 48 in a set if necessary (step H10). A series of processes regarding the photography thus terminates, and a return is made to the processing in step H01 to again prepare for next photography.

Thus, the photography in accordance with the bracketing contents set by the user as required is performed together with the photography with the autofocus, and the image data are stored/saved in a set. Therefore, even when the still images captured by the actuation of the autofocus function result in out-of-focus images or have contents different from the intent of the user, it is possible to obtain still images suited to the intent of the user with a high probability.

Ninth Embodiment

A ninth embodiment in which the present invention is applied to a digital camera will hereinafter be described in reference to the drawings.

It is to be noted that an external configuration of the digital camera is basically similar to that in FIG. 1A and FIG. 1B and a functional configuration of an electronic circuit is basically similar to that in FIG. 2, so that the same numerals are used for the same parts and those parts are not shown and described.

Now, an operation in this embodiment will be described.

It is to be noted that in a digital camera 1, a shutter key 9 has a two-stage operation stroke as in other typical cameras, and a photographing operation is executed on the basis of an operation logic as follows: at a first step, autofocus (AF) processing and automatic exposure (AE) processing are performed in a state generally called half press where the shutter key is pressed down to about half of a full stroke, and individual values in the processing are locked; and at a second step, actual photography is executed with the above AF value and AE value in an operation with a full stroke generally called full press.

Furthermore, photography with a fixed focus described later (referred to as "PF photography" in the drawing) means photography performed by so-called "stop-down" wherein a focus lens is moved to a predetermined position and an aperture (F) value and a shutter speed are read and set on the basis of a lookup table fixedly prestored in a ROM within a control unit 42 in accordance with the focal distance position of the zoom lens selected at the moment, an ISO film speed set at the moment and an AE value (light amount), thereby performing photography by obtaining a state called pan focus (PF) where a depth of field practically covering the whole distance is obtained, or by obtaining a fixed great depth of field close to the above-mentioned depth of field.

Moreover, in scene program photography described later, one is selected from a plurality of kinds for which settings of photographing conditions have been preprogrammed so that photography can be automatically performed with setting optimum for a scene to be photographed in a photographing mode. For example, one is selected from "person", "scenery", "scenery and person", "close-up of person", "close-up of bust of person", "two persons", "child", "candlelight and person", "party", "pet", "close-up of flower", "bright green", "autumn leaves", "smooth water flow", "stopped spray", "building", "cityscape", "blue sky", "bright sand beach and sea", "setting sun", "night scenery", "night scene and person", "firework", "food", "characters", etc.

Specific set contents of the photographing condition include examples as follows. For "bright green", hard sharpness, higher chroma and color emphasis of green are set. Alternatively, for "candlelight and person", soft sharpness, white balance of sunlight, a lower shutter speed and a flash mode of red-eye reduction are set.

Depending on the selected contents for the scene program photography, it is highly likely that the autofocus operation is difficult and photography results in a failure, for example, in a case of a moving subject such as "child", "pet" and "stopped spray", or in a case where insufficient illumination is anticipated as in "candlelight and person", "party" and "night scene".

Therefore, photography with the fixed focus is automatically utilized as needed in addition to the autofocus photography to adapt to the selected content for the scene program photography.

Figure 12:
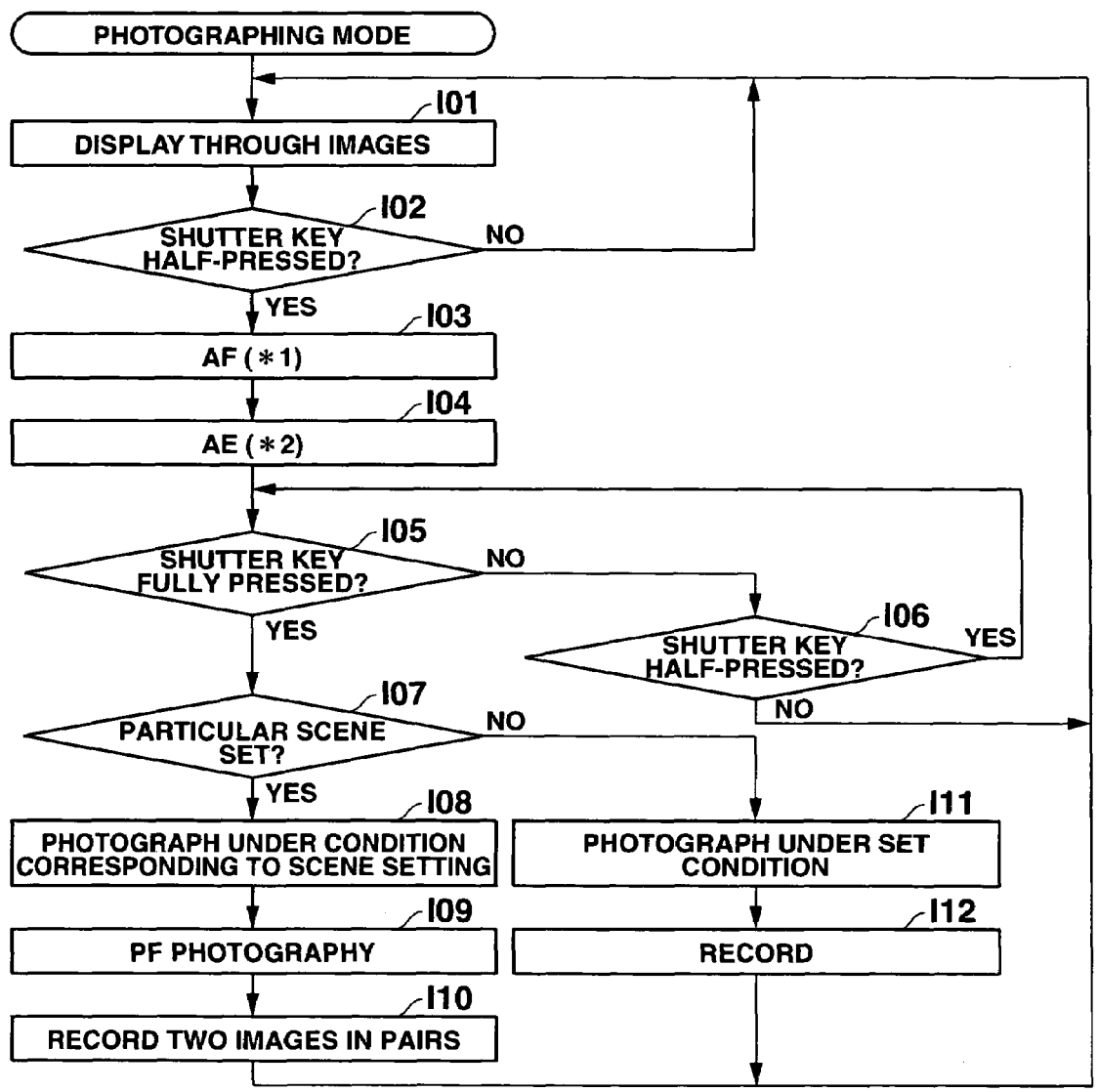
FIG. 12 is a flowchart showing processing contents in a photographing mode according to a ninth embodiment of the present invention.

FIG. 12 shows contents of processing performed when any one of the contents for the scene program photography is selected and thus a still image is captured in the photographing mode. Initially, simple AF processing and AE processing are executed within a predetermined frame rate at the moment, for example, 30 [frames/second], and a CCD 33 is sequentially driven at a high shutter speed considering the frame rate, thereby maintaining a through image display state in which contents imaged by the CCD 33 are displayed on a display section 21 (step I01), and also judging whether or not the shutter key 9 of a key input section 49 has been half-pressed (step I02). Such processing is repeatedly performed to wait for the shutter key 9 to be in a half-pressed state.

Thus, if the shutter key 9 is half-pressed, this is judged in step I02, and the value of a distance to a subject is accurately measured by the AF processing as required, and the focal distance value is locked (step I03). A proper exposure value is obtained from a state in which the autofocus position is locked, and an aperture value and a shutter speed are set from the exposure value and locked as required (step I04).

It is to be noted that as indicated by "*1" and "*2" in the drawing, the AF processing and the AE processing are executed as required depending on the content for the scene program photography selected at the moment. This includes a case where the AF processing and the AE processing are not performed for some contents and a case where results of the processing are corrected if performed. For example, when "night scene" is selected, the in-focus position is unconditionally set to infinity. Alternatively, for "bright sand beach and sea", exposure is corrected to a positive side.

Subsequently, it is repeatedly judged whether or not the shutter key 9 has been further fully pressed (step I05) or whether or not it is still half-pressed (step I06), thus waiting for the shutter key 9 to be fully pressed while states of the AF and AE are locked or waiting for the half-pressed state to be cancelled.

Here, when the half-press operation for the shutter key 9 is cancelled, this is judged in step I06, and a return is made again to the processing in step I01.

Furthermore, if the shutter key 9 is fully pressed from the state in which the AF value and AE value are locked, this is judged in step I06. Then, it is judged whether or not the scene program photography selected at the moment is particular one that uses photography with the fixed focus together (step I07).

Here, when it is judged that the particular scene program photography is selected, a still image is captured in accordance with the set contents of the selected photographing condition, and obtained data is retained in a DRAM 41 (step I08). Then, the position of a focus lens of a lens optical system 32 is suitably moved in accordance with the position of a zoom lens of the lens optical system 32 selected at the moment, and thus a still image is also captured with the fixed focus, and obtained data is retained in the DRAM 41 (step I09).

In the case where the photography with the fixed focus is performed, not only the position of the zoom lens of the lens optical system 32 but also the position of the focus lens is moved considering the contents for the scene program photography only when perfect pan focus effects can not be obtained. For example, the position is moved closer to the infinity side for "scenery", "night scene", etc, whereas it is moved closer to a shortest photographing distance side for "pet", "close-up of flower", etc. In this way, an in-focus range may be moved back and forth and set in accordance with the distance from the target subject.

Then, after the photography corresponding to the operation of the shutter key 9 has terminated, data on the two still images retained in the DRAM 41 are compressed and converted into files in a JPEG circuit 46, and stored/saved on an internal memory 47 or a memory card 48 in a set (step I10). A series of processes regarding the photography thus terminates, and a return is made to the processing in step I01 to again prepare for next photography.

Moreover, when it is judged in step I07 that the scene program photography selected at the moment is not the particular one that uses photography with the fixed focus together, a still image is captured in accordance with the set contents of the selected photographing condition, and obtained data is retained in the DRAM 41 (step I11). Then, considering that the photography corresponding to the operation of the shutter key 9 has terminated, data on the still image retained in the DRAM 41 is immediately compressed and converted into a file in the JPEG circuit 46, and solely stored/saved on the internal memory 47 or the memory card 48 (step I12). A series of processes regarding the photography thus terminates, and a return is made to the processing in step I01 to again prepare for next photography.

Thus, the still image based on the fixed focus is captured together when considered necessary in accordance with the content selected from a plurality of prepared contents for the scene program photography. Therefore, even when the still image based on the autofocus is out of focus, it is highly likely that the still image captured with the fixed focus as required is in focus. This makes it possible to capture and store a still image focused on the desired subject with a high probability without particularly increasing in size and complicating the apparatus and circuits.

Tenth Embodiment

A tenth embodiment in which the present invention is applied to a digital camera will hereinafter be described in reference to the drawings.

It is to be noted that an external configuration of the digital camera is basically similar to that in FIG. 1A and FIG. 1B and a functional configuration of an electronic circuit is basically similar to that in FIG. 2, so that the same numerals are used for the same parts and those parts are not shown and described.

Now, an operation in this embodiment will be described.

It is to be noted that in a digital camera 1, a shutter key 9 has a two-stage operation stroke as in other typical cameras, and a photographing operation is executed on the basis of an operation logic as follows: at a first step, autofocus (AF) processing and automatic exposure (AE) processing are performed in a state generally called half press where the shutter key is pressed down to about half of a full stroke, and individual values in the processing are locked; and at a second step, actual photography is executed with the above AF value and AE value in an operation with a full stroke generally called full press.

In addition, the shutter key 9 in a key input section 49 not only has the two-stage operation stroke but also has a touch sensor function to detect the touch of a hand/finger of a user on a surface.

Furthermore, photography with a fixed focus described later (referred to as "PF photography" in the drawing) means photography performed by so-called "stop-down" wherein a focus lens is moved to a predetermined position and an aperture (F) value and a shutter speed are read and set on the basis of a lookup table fixedly prestored in a ROM within a control unit 42 in accordance with the focal distance position of a zoom lens selected at the moment, an ISO film speed set at the moment and an AE value (light amount), thereby performing photography by obtaining a state called pan focus (PF) where a depth of field practically covering the whole distance is obtained, or by obtaining a fixed great depth of field close to the above-mentioned depth of field.

Figure 13:
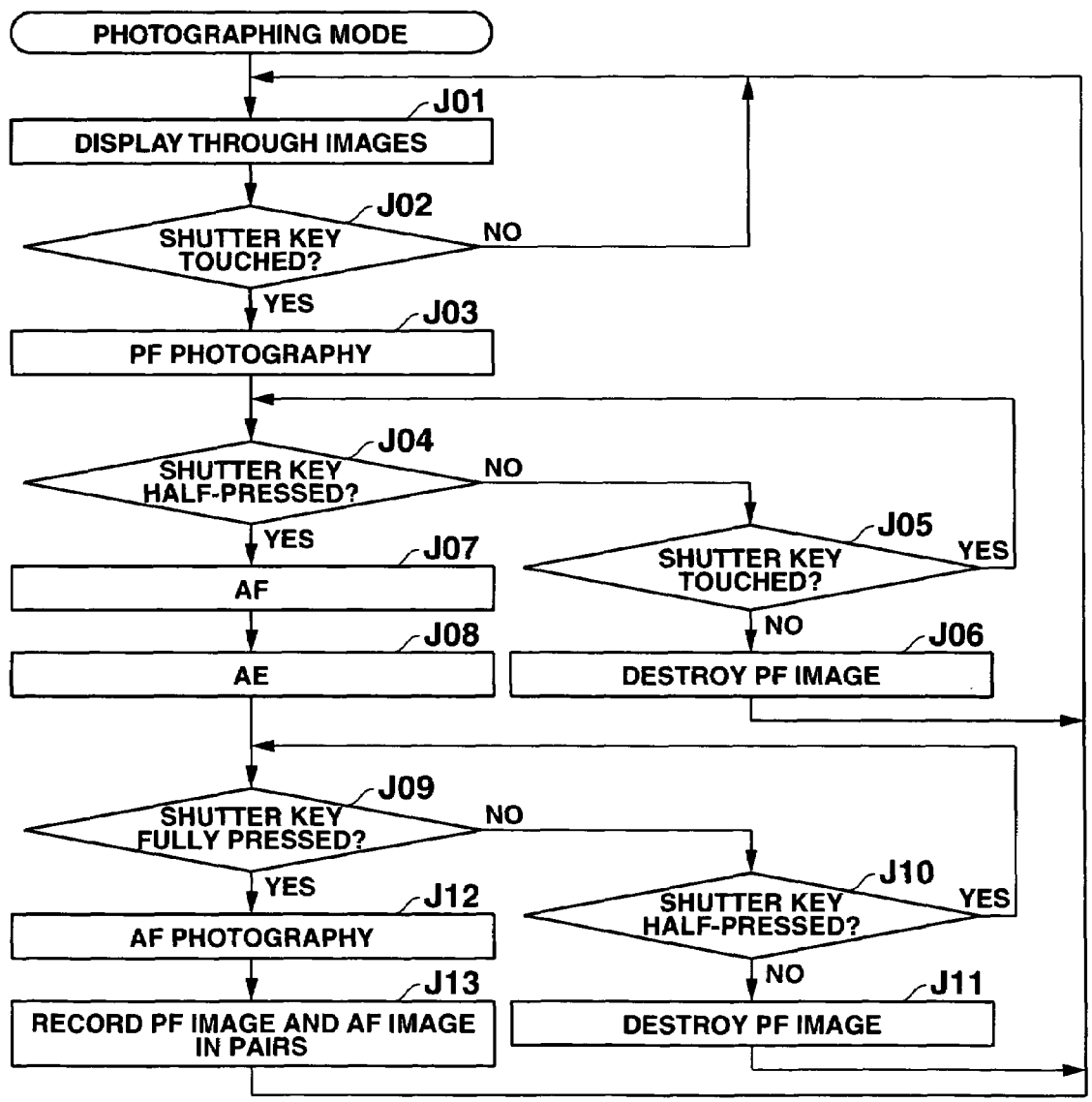
FIG. 13 is a flowchart showing processing contents in a photographing mode according to a tenth embodiment of the present invention.

FIG. 13 shows contents of processing performed when a still image is captured in the photographing mode. Initially, simple AF processing and AE processing are executed within a predetermined frame rate at the moment, for example, 30 [frames/second], and a CCD 33 is sequentially driven at a high shutter speed considering the frame rate, thereby maintaining a through image display state in which contents imaged by the CCD 33 are displayed on a display section 21 (step J01), and also judging whether or not the hand/finger of the user has touched the surface of the shutter key 9 of a key input section 49 (step J02). Such processing is repeatedly performed to wait for the shutter key 9 to be touched.

Thus, if the shutter key 9 is touched, this is judged in step J02. The focus lens of the lens optical system 32 is moved in accordance with the focal distance and the AE value corresponding to the position of the zoom lens of the lens optical system 32 at the moment, so that photography is performed with a fixed focus allowing a fixed great depth of field to be obtained, and an obtained image is retained in a DRAM 41 (step J03).

Subsequently, it is repeatedly judged whether or not the shutter key 9 is half-pressed (step I04) or whether or not the surface of the shutter key 9 is still touched (step I05), thus waiting for the shutter key 9 to be half-pressed or waiting for the touched state of the shutter key 9 to be cancelled.

Here, when the touched state of the shutter key 9 is cancelled, this is judged in step J05, concluding that the operation of the shutter key 9 has not been reached. Data on the still image retained in the DRAM 41 at the moment and obtained by the photography based on the fixed focus in step J03 is deleted for nullification (step J06), and a return is made again to the processing in step J01.

Furthermore, when it is judged in step J04 that the shutter key 9 is half-pressed, the value of a distance to a subject is accurately measured in accordance with the operation, and the focal distance value is locked (step J07).

Then, a proper exposure value is obtained from a state in which the autofocus position is locked, and an aperture value and a shutter speed are set from the exposure value and locked (step J08). Thus, it is repeatedly judged whether or not the shutter key 9 is fully pressed (step J09) or whether or not it is still half-pressed (step J10), thus waiting for the shutter key 9 to be fully pressed while states of the AF and AE are locked or waiting for the half-pressed state to be cancelled.

Here, when the half-pressed state of the shutter lens 9 is cancelled, this is judged in step J10, concluding that the full-press operation of the shutter key 9 has not been reached. Data on the still image retained in the DRAM 41 and the moment and obtained by the photography based on the fixed focus in step J03 is deleted for nullification (step J11), and a return is made again to the processing in step J01.

Furthermore, if the shutter key 9 is fully pressed from the state in which the AF value and AE value are locked, this is judged in step J09, and a still image is captured in a state where photographing conditions based on a autofocus function remain locked to obtain image data (step J12).

Subsequently, both data on the still image obtained with the autofocus and data on the still image obtained by the fixed focus in step J03 are compressed and converted into files in a JPEG circuit 46, and stored/saved on an internal memory 47 or a memory card 48 (step J13). A series of processes regarding the photography thus terminates, and a return is made to the processing in step J01 to again prepare for next photography.

Thus, even when the still image captured by the actuation of the autofocus function is out of focus or blurred due to a factor such as hand movement, it is highly likely that the still image captured with the fixed focus immediately before the autofocus photography is sufficiently vivid. This makes it possible to capture and store a still image focused on the desired subject with a high probability without particularly increasing in size and complicating the apparatus and circuits.

In addition, the still image based on the fixed focus is captured at the point where the shutter key 9 is touched, and the still image based on the autofocus is captured in the subsequent full-press operation, thereby allowing the user to obtain the still image based on the fixed focus without feeling discomfort.

Furthermore, when the actual photography by the autofocus function has not been reached, the data on the image based on the fixed focus captured earlier is destroyed, and it is therefore ensured that unnecessary waste of limited storage capacity in the internal memory 47 or the memory card 48 can be avoided.

Eleventh Embodiment

An eleventh embodiment in which the present invention is applied to a digital camera will hereinafter be described in reference to the drawings.

It is to be noted that an external configuration of the digital camera is basically similar to that in FIG. 1A and FIG. 1B and a functional configuration of an electronic circuit is basically similar to that in FIG. 2, so that the same numerals are used for the same parts and those parts are not shown and described.

Now, an operation in this embodiment will be described.

It is to be noted that data on sequentially captured two still images, that is, data on the still image obtained with an autofocus and data on the still image captured with a fixed focus are stored in pairs in a data folder of the same name in an internal memory 47 or a memory card 48.

In this case, for image data files of the still images stored in pairs in the data folder, file names such as "200309080001a.jpg" "200309080001b.jpg" are set and stored in the data folder whose name is "200309080001". The two data files can be recognized as a pair from the file name, and differentiated.

In the above-mentioned data folder name itself and the file names, "200309080001" indicates that the photography was performed on "2003(year)09(month)08(date)" "0001(first)". Photographing condition data additionally set to the actual image data in each file include typical information such as photographing date and time, the ISO film speed, an image size, a shutter speed, an aperture (F) value and a while balance, as well as identification information on whether the photography was conducted by the actuation of the autofocus function or by the fixed focus.

Therefore, it is possible not only to identify, owing to the file names of the stored data files, that the two still images are paired and were sequentially captured but also to know from the photographing condition data whether the photography was conducted by the actuation of the autofocus function or by the fixed focus.

Figure 14:
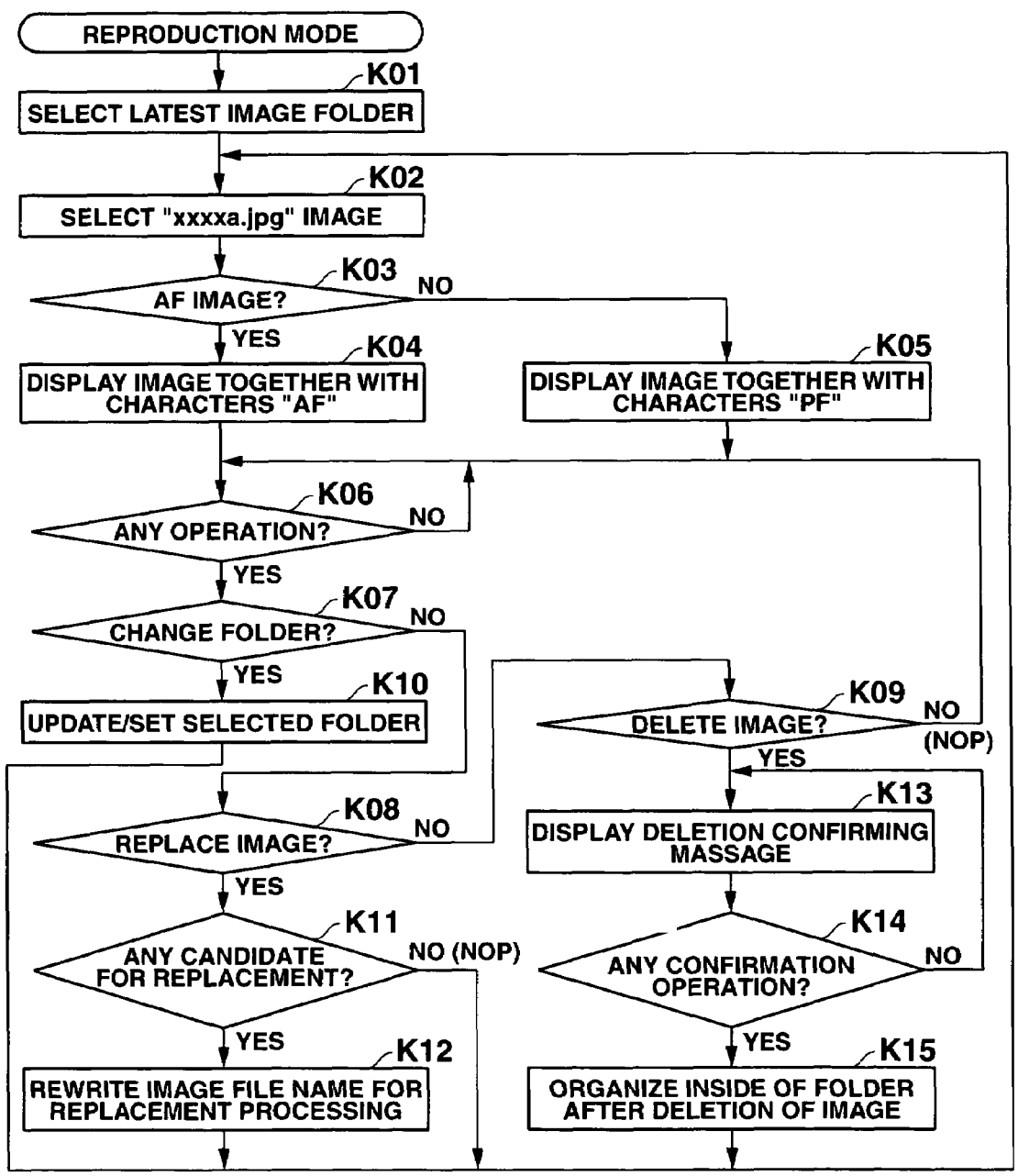
FIG. 14 is a flowchart showing processing contents in a photographing mode according to an eleventh embodiment of the present invention.

FIG. 14 shows contents of processing of, for example, rewriting an order of priority among a plurality of data folders mainly storing paired image data in a state where a reproduction mode as a basic mode is selected. Initially, among a plurality of image data folders stored in an internal memory 47 or a memory card 48, the latest folder, that is, the folder having the highest value of a numerical portion in the data folder name is selected (step K01).

Next, in the selected data folder, the data file of the still image (.jpg (=JPEG)) whose name ends with "a" is selected as one with a higher order of priority (step K02).

Then, the identification information indicating whether the photography was performed by the actuation of the autofocus function or by the fixed focus is read from the photographing condition data additionally set in the selected image data file of the still image, and the contents of the information is judged (step K03).

When the photography is judged to have been performed by the actuation of the autofocus function, corresponding image data is read and expanded, and then displayed on a display section 21 in a state where characters "AF" are superposed at an upper left end in a screen as shown in FIG. 4B (step K04).

Furthermore, when the photography was not performed by the actuation of the autofocus function but performed with the fixed focus, corresponding image data is read and extracted, and then displayed on the display section 21 in a state where characters "PF" are superposed at the upper left end in the screen as shown in FIG. 4A (step K05).

It is repeatedly judged whether or not any key operation is made by a key input section 49 while maintaining the state of image display in step K04 or K05, thereby waiting for a corresponding key operation to be made (step K06).

If any key operation is performed, this is judged in step K06. Then, it is judged whether or not this key operation has been performed to change the data folder, more specifically, for example, whether or not this operation has been performed by the operation of a leftward key or a rightward key of a ring key 14 (step K07).

Here, if it is judged that the key operation has been performed to change the data folder, processing will be performed to change the data folder in accordance with the contents of the key operation (step K10), and a return is made to the processing in step K02 to display image data with a higher order of priority in the changed data folder.

Moreover, if it is judged in step K07 that the key operation has not been performed to change the data folder, it will then be judged whether the key operation has been performed to change the order of priority of the images, more specifically, for example, whether or not a menu key 16 has been operated and a "replace" menu has been subsequently selected (step K08).

Here, if it is judged that the key operation has been performed to change the order of priority of the images, it will then be judged whether or not there is, in the same data folder, candidate image data for replacement, that is, image data whose file name ends with "b" (step K11).

At this point, only when it is judged that there is the candidate image data for replacement, the file name of the image data is set to be rewritten for replacement processing (step K12), and a return is made to the processing in step K02 to display the image data whose order of priority has become higher owing to the changed contents.

Thus, when the still image with a higher order of priority can not be enjoyed due to blurring or the like, and the other still image of the pair (with a lower order of priority) is clearer, the order of priority influencing the display can be easily rewritten by the key operation to replace the image data.

Furthermore, if it is judged in step K11 that there is not any candidate image data for replacement in the same data folder, this instruction for replacement is processed as invalid (NOP), and a return is made to the processing in step K02.

Moreover, if it is judged in step K08 that the key operation has not been performed to change the order of priority of the images, it will then be judged whether or not the key operation has not been performed to delete the image data displayed at the moment, more specifically, for example, whether or not the menu key 16 has been operated and a "delete" menu has been subsequently selected (step K09).

Here, if it is judged that the key operation has been performed to delete the image, a guide massage is displayed on the display section 21 to indicate that the image can not be restored once deleted and to confirm the deletion (step K13), thus waiting for the confirmation operation to be performed (step K14).

Then, at the point where the confirmation operation is judged to have been made, the image data file for the still image is set to be deleted from the data folder. In addition, the inside of the data folder is organized, for example, the file names of the remaining data on the still images are adjusted, or the data folder itself is set to be deleted if no image data remains in the data folder (step K15). Then, a return is made again to the processing in step K02.

It is to be noted that if it is judged in step K09 that the key operation has not been performed to delete the image data displayed at the moment, processing corresponding to the contents of the key operation is performed. However, this is not explained in the present embodiment, and this key operation is expressed as invalid in the drawing.

In this way, the still images sequentially captured by the actuation of the autofocus function and the still images based on the fixed focus are stored in pairs in the internal memory 47 or the memory card 48, and one with a higher order of priority among these still image is selected and displayed. Moreover, the order of priority can be arbitrarily rewritten in the simple key operation. This makes it possible to read and display a better image reflecting the intent of the user in the simple key operation.

It is to be noted that the data on the two still images in pairs are stored on the internal memory 47 or the memory card 48 in a state contained in the data folder of the same name in the eleventh embodiment described above. However, the present invention is not limited thereto, and the paired image data may be stored in a place other than the data folder.

Moreover, all the first to eleventh embodiments described above concern the cases appropriate for the digital camera. However, the present invention is not limited thereto, and is also applicable to other small-sized electronic devices such as mobile telephones and personal digital assistants (PDAs) having a camera function capable of autofocus by the movement of the focus lens in the lens optical system.

In addition, the present invention is not limited to the embodiments described above, and various modifications can be made without departing from the spirit thereof.

Furthermore, the embodiments described above include various stages of the invention, and various inventions can be extracted by proper combinations of a plurality of disclosed requirements. For example, although some of all the requirements disclosed in the embodiments are deleted, it is still possible to solve at least one of the problems described in the section of "Description of the Related Art", and at least one of the effects described in the section of "SUMMARY OF THE INVENTION". In this case, a configuration in which those requirements are deleted can be extracted as an invention.

What is claimed is:

1. An imaging apparatus comprising:
    a photographing unit which has an autofocus function and captures a subject image;
    an instruction unit which issues an instruction to perform photography by the photographing unit; and a photographing control unit which causes the photographing unit to execute autofocus photography to capture a still image by actuating the autofocus function and to capture a still image by moving a lens to a predesignated position where a fixed depth of field can be obtained, in accordance with the instruction from the instruction unit;

wherein the instruction unit has a two-stage operation stroke;

wherein the photographing control unit causes the photographing unit to execute the photography performed by the movement of the lens to the predesignated position where the fixed depth of field can be obtained in a first-stage operation of the instruction unit, and causes the photographing unit to execute the autofocus photography in a second-stage operation of the instruction unit; and wherein when the photographing control unit has not executed the autofocus photography after the photography performed by the movement of the lens to the predesignated position where the fixed depth of field can be obtained, the photographing control unit destroys image data obtained by the photography performed by the movement of the lens to the predesignated position where the fixed depth of field can be obtained.

* * * * *